(12) United States Patent
Flocchini

(10) Patent No.: US 10,645,854 B2
(45) Date of Patent: May 12, 2020

(54) CUTTING HEAD FOR VINEYARD AND ORCHARD TILLER/CULTIVATOR

(71) Applicant: Andrew J. Flocchini, Petaluma, CA (US)

(72) Inventor: Andrew J. Flocchini, Petaluma, CA (US)

( * ) Notice: Subject to any disclaimer, the term of this patent is extended or adjusted under 35 U.S.C. 154(b) by 0 days.

(21) Appl. No.: 16/430,102

(22) Filed: Jun. 3, 2019

(65) Prior Publication Data

US 2019/0380252 A1 Dec. 19, 2019

Related U.S. Application Data

(60) Provisional application No. 62/679,682, filed on Jun. 1, 2018.

(51) Int. Cl.

| | |
|---|---|
| *A01B 39/16* | (2006.01) |
| *A01B 33/06* | (2006.01) |
| *A01B 33/08* | (2006.01) |
| *A01B 33/10* | (2006.01) |
| *A01B 39/20* | (2006.01) |
| *A01B 39/18* | (2006.01) |
| *A01B 63/02* | (2006.01) |
| *A01B 63/12* | (2006.01) |
| *A01B 39/08* | (2006.01) |

(52) U.S. Cl.
CPC ............ *A01B 39/166* (2013.01); *A01B 33/06* (2013.01); *A01B 33/087* (2013.01); *A01B 33/10* (2013.01); *A01B 39/085* (2013.01); *A01B 39/18* (2013.01); *A01B 39/20* (2013.01); *A01B 63/023* (2013.01); *A01B 63/12* (2013.01)

(58) Field of Classification Search
CPC ..... A01B 33/06; A01B 33/085; A01B 33/106; A01B 39/085; A01B 39/166; A01B 63/023
USPC ........ 172/48, 54.5, 58, 59, 97, 99, 111, 522, 172/614, 645
See application file for complete search history.

(56) References Cited

U.S. PATENT DOCUMENTS

| 2,732,783 | A | * | 1/1956 | Murphy | ................. | A01B 33/06 |
| | | | | | | 172/56 |
| 3,059,704 | A | * | 10/1962 | Kasatkin | ................ | A01B 33/06 |
| | | | | | | 172/38 |
| 3,750,376 | A | * | 8/1973 | Cioni | ................... | A01B 39/166 |
| | | | | | | 56/10.4 |

(Continued)

*Primary Examiner* — Gary S Hartmann
(74) *Attorney, Agent, or Firm* — Craig M. Stainbrook; Stainbrook & Stainbrook, LLP

(57) ABSTRACT

A tractor mounted tiller/cultivator system that includes right and left swing arms pivotally attached to tractor chassis, right and left cutting head assemblies mounted on the swing arms, each including a right disc motor driving a rotary disc mounted on a distal portion of the swing arm and operatively coupled to the motor. Ground-engaging cultivation wheels surround the rotary disc, and an annular guard prevents unwanted contact of the wheels with vines or trunks of vines and trees. A drive mechanism lowers and raises the swing arms to put the cultivation wheels into engagement and disengagement with ground and to rotate said swing arms about their longitudinal axes. User controls operatively connected to the swing arms, cutting head assemblies, and drive mechanisms enable a user to finely tune the movement of the cutting heads into and out from rows of trees or vines.

15 Claims, 24 Drawing Sheets

(56) References Cited

U.S. PATENT DOCUMENTS

| | | | | |
|---|---|---|---|---|
| 3,903,969 A | * | 9/1975 | Bellussi | A01B 33/087 |
| | | | | 172/5 |
| 4,384,618 A | * | 5/1983 | Williams | A01B 39/166 |
| | | | | 172/38 |
| 6,840,026 B2 | | 1/2005 | Pellenc et al. | |
| 2008/0078154 A1 | * | 4/2008 | Wright | A01D 34/84 |
| | | | | 56/10.4 |

* cited by examiner

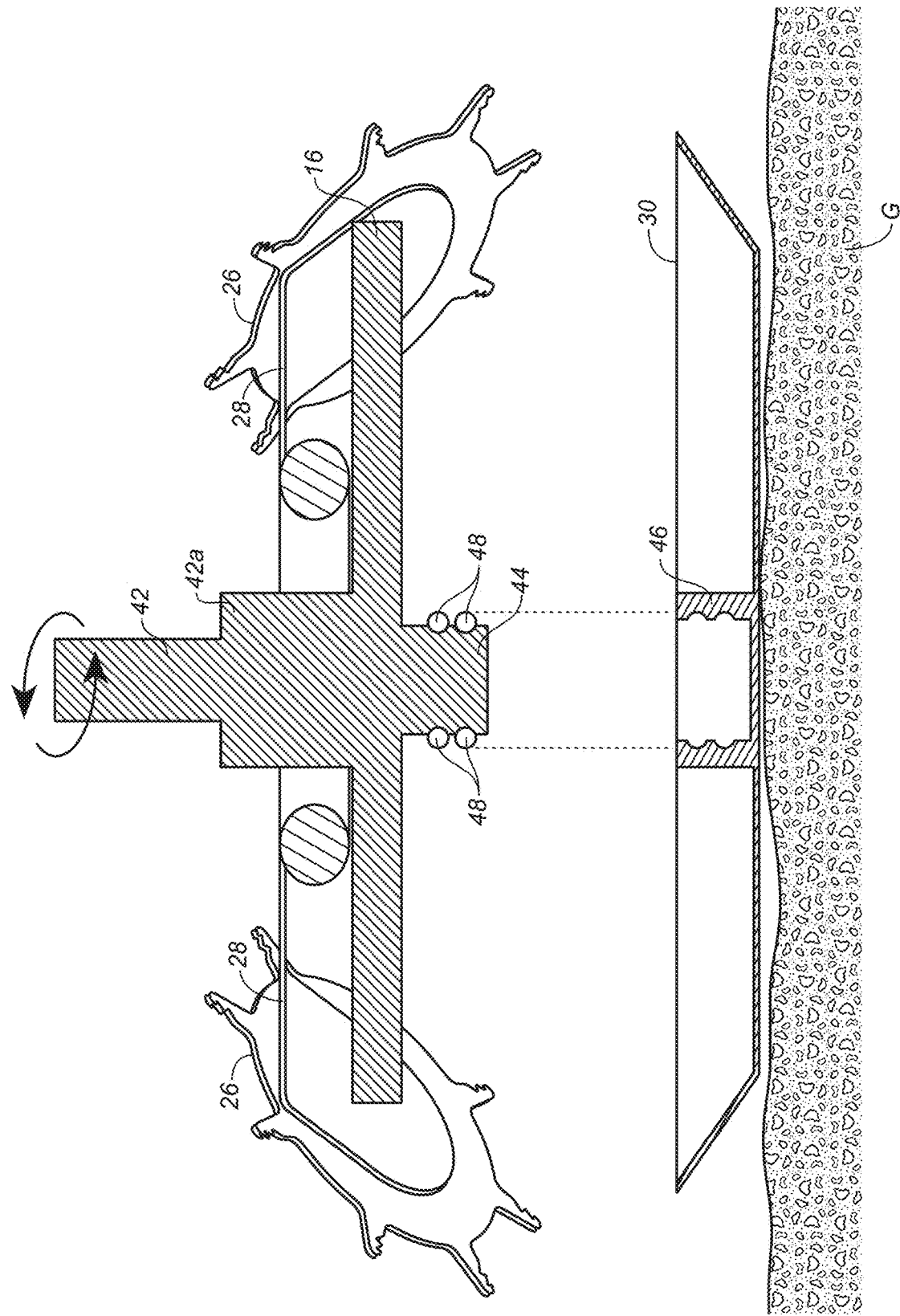

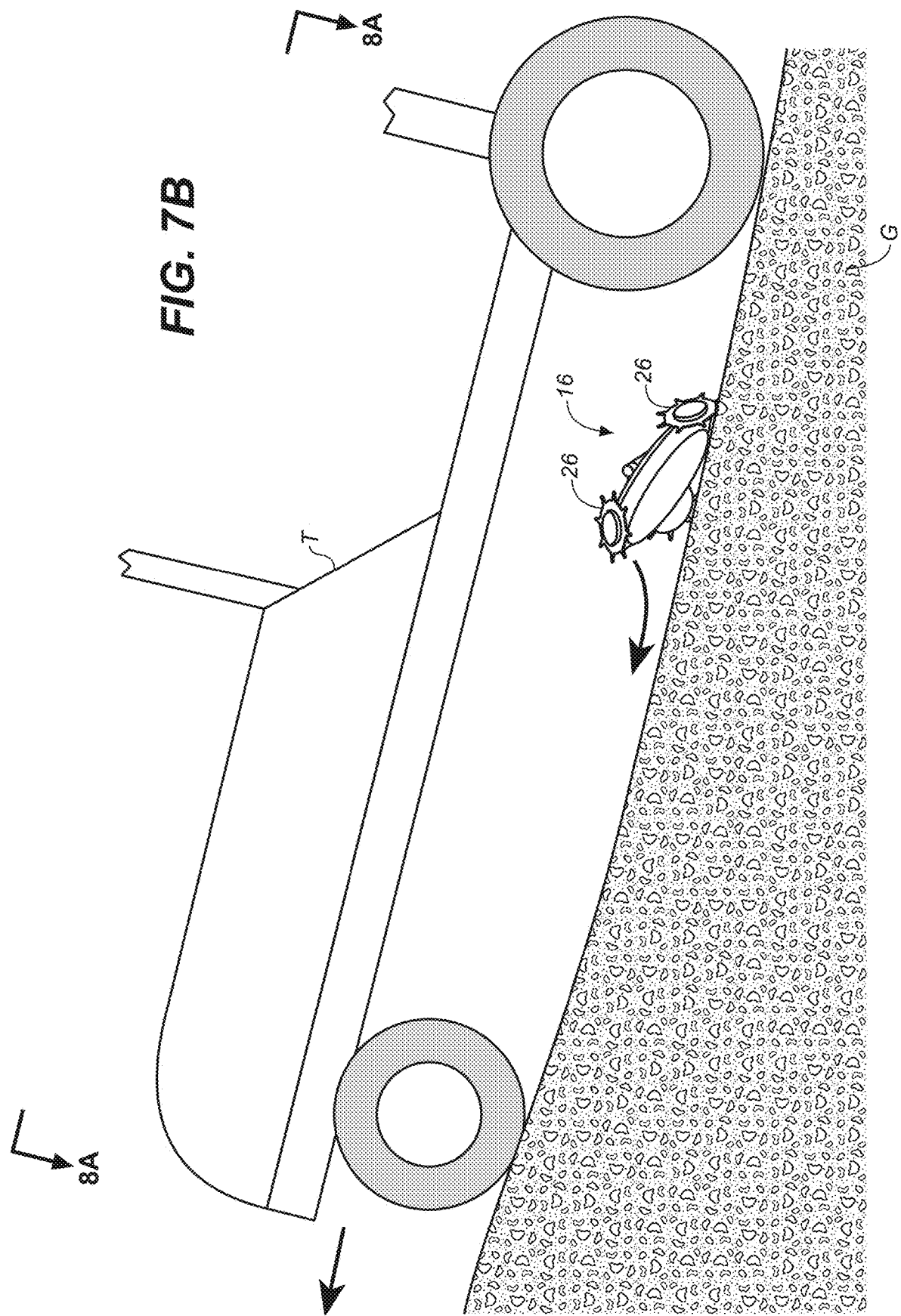

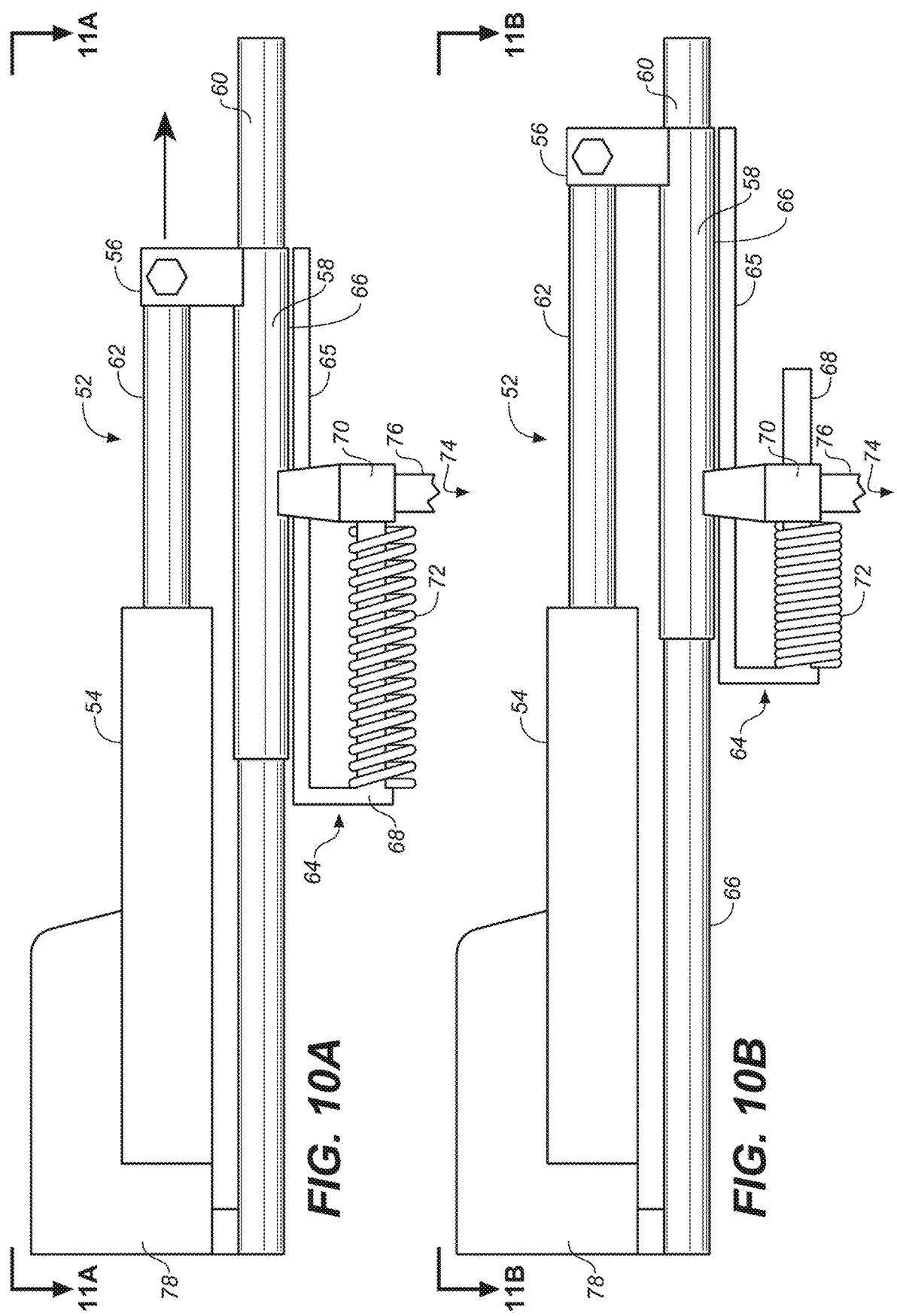

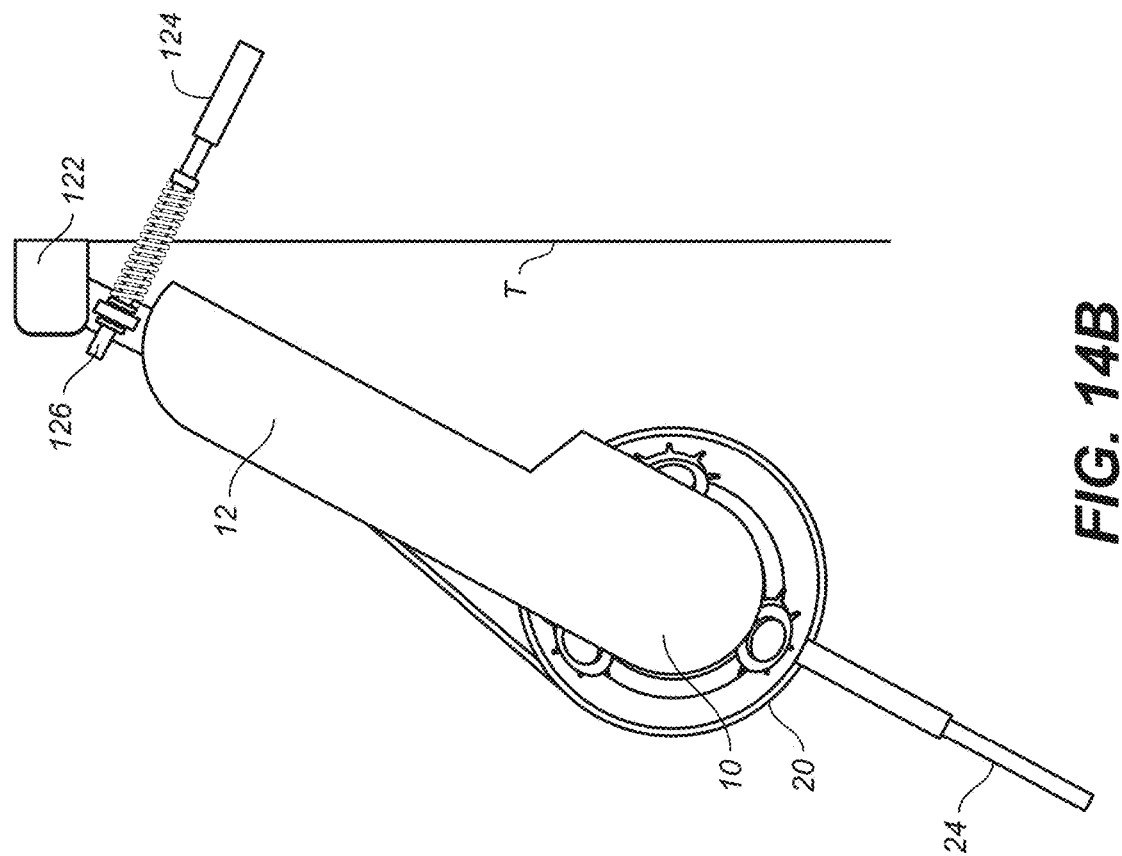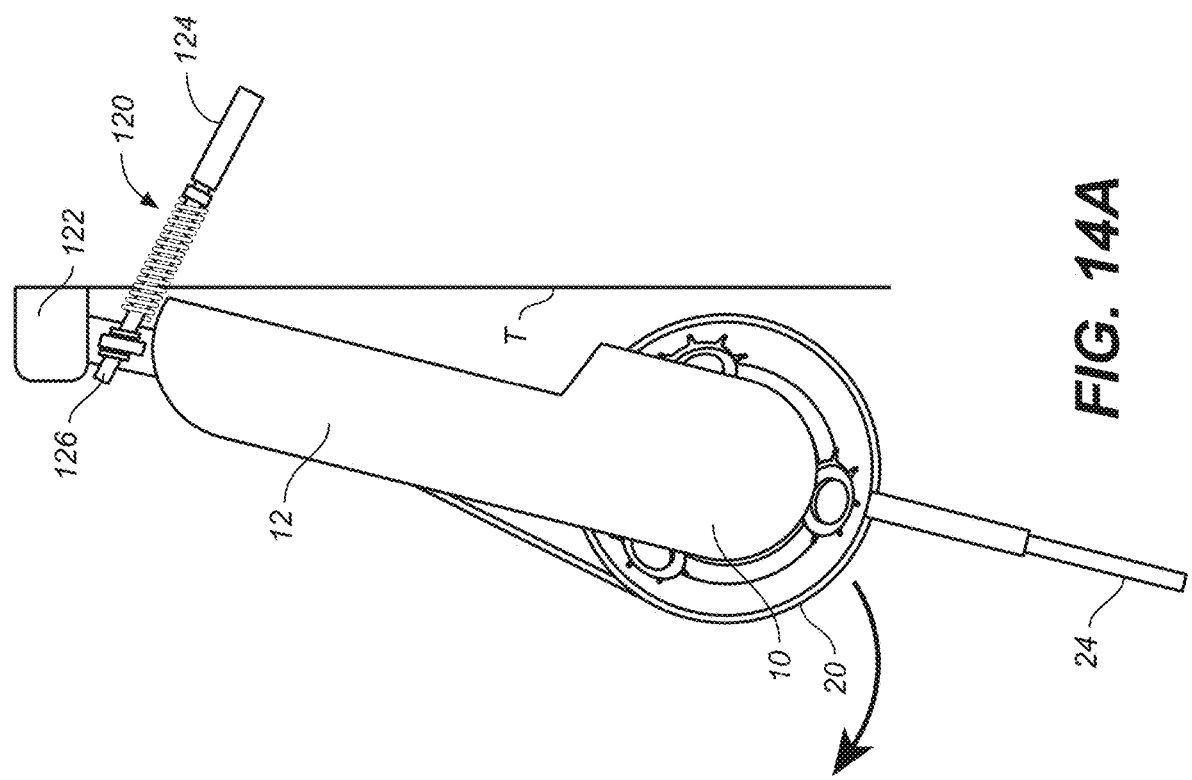

U.S. 10,645,854 B2

CUTTING HEAD FOR VINEYARD AND ORCHARD TILLER/CULTIVATOR

CROSS REFERENCES TO RELATED APPLICATIONS

The present application claims the benefit of U.S. Provisional Patent Application Ser. No. 62/679,682, filed Jun. 1, 2018 (Jun. 1, 2018), which application is incorporated in its entirety by reference herein.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention

The present invention relates most generally to farming equipment for cultivating, tilling, and weeding soil around and between fruit-bearing trees and shrubs planted in rows, and more particularly to tilling and weeding machines for vineyards and orchards.

Background Discussion

Numerous automated weeding and tilling machines for removing weeds and tilling soil between row-planted grapevines and fruit trees are known. Their shared purpose is the removal of unwanted plants or weeds between the vines or trees without the use of potentially toxic herbicides, most notably glyphosate. They accomplish the task by breaking up the soil and mulching or otherwise shredding the unwanted plant material. Most are mounted on the rear of a farming tractor and couple to the power take-off to drive rotating blades, discs, tines, or other soil cultivating elements. This arrangement introduces a first shortcoming in the known art.

More advanced tilling systems for row planted shrubs, trees, or vines include one or more tilling heads that move laterally relative to the tractor into ground immediately between the main vine or tree trunks. However, preventing the cutting head from coming into direct contact with the trunk is necessary to prevent damage to the plant. Accordingly, some are equipped with mechanical or electrical sensing devices that lead the cutting head and trigger a lateral retraction of the cutting head back toward the tractor as the cutting head approaches the trunk. The retraction is typically accomplished using a pneumatic or hydraulic actuators. Then, after the tilling/cutting head has passed the trunk, the cutting head moves laterally back into the area between the row-planted vines or trees. In this manner, the need for hand tilling between plant trunks is obviated.

However, the known systems, even those having such the above-described mechanical features, include several drawbacks. For example, even though these automated tillers move laterally in and out of the planted rows when a plant is sensed, the lateral movement away from the trunks typically prevents the tilling head from removing weeds immediately surrounding the trunks. Additionally, sensors triggered too easily may cause the tilling head to pass and leave untouched large patches of weeds in the tilling areas. Further still, sensors simply fail, and the many years invested in a valuable plant may be lost in an instant.

Moreover, most in-row tillers are single mounted on the rear of a tractor with switches that trigger motors to retract or extent cutters into the planted row. This requires that the operator either look back to time the retractions and extensions or to work while looking in a mirror, and imperfect solution, at best; steering is difficult, it strains the neck, and the view is partial and compromised.

BRIEF SUMMARY OF THE INVENTION

The present invention is a dual-head in-row tiller/cutter for tractor installation in front of the operator seat. Each head in the dual head system includes a cutting head installed on an arm that deploys pivotally and outwardly from the side of a tractor. The cutting head itself is a motorized rotary disc with freely spinning cutting wheels ("star wheels") pivotally disposed circumferentially around the rotary disc.

In a most salient feature, the inventive tilling/cutting head uses tilt relative to ground to control migration into and out from the in-row position of the head.

BRIEF DESCRIPTION OF SEVERAL VIEWS OF THE DRAWINGS

FIG. 6B is an exploded view thereof;

FIG. 7B shows a possible angle of attack for the cutting head on a steeper uphill incline;

FIG. 10A is a side view in elevation showing the adjustable compression spring in an uncompressed configuration;

FIG. 10B is the same view showing the adjustable compression spring in a pre-compressed configuration;

FIG. 14A is an upper left side top plan view showing the adjustment mechanism for deploying the swing arm outward and retracting it inward;

FIG. 14B is an upper left side top plan view showing the swing arm in an extended and deployed position.

DETAILED DESCRIPTION OF THE INVENTION

Figure 1:
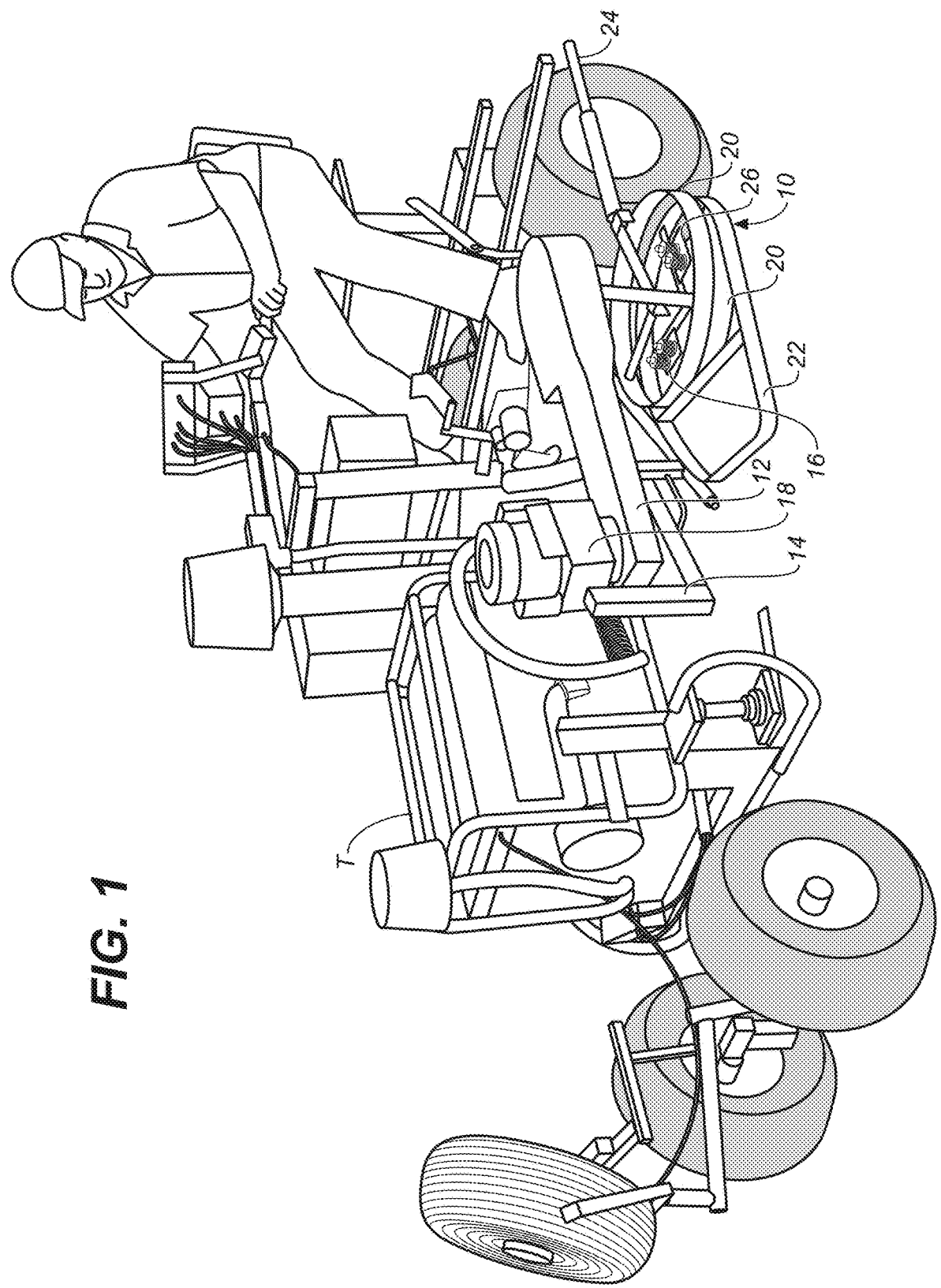
FIG. 1 is an upper front perspective view of a tractor with the inventive cutting heads mounted on a tiller system.

Referring to FIGS. 1 through 15B, wherein like reference numerals refer to like components in the various views, there is illustrated therein a new and improved cutting head for a vineyard and orchard tiller and cultivator, generally denominated 10 herein.

FIG. 1 shows the inventive cutting head 10 for a tiller/cultivator installed on a farm tractor T. The cutting head is mounted on the outboard (distal) portion of a swing arm 12 pivotally and adjustably connected to a mounting bar 14 coupled to the tractor frame. The cutting head includes a belt driven rotary disc 16 having a motor 18 mounted on the inboard portion of the swing arm (i.e., the portion proximal to the tractor frame or chassis). [Note: FIG. 1 shows the assembly with protective shrouds removed for ease of viewing.]

An annular cage or guard rail 20 surrounds the rotary disc and includes an angled rail extension 22 which projects slightly forward of the annular cage and swing arm as it pivots outwardly. A pivoting trailing stick or limiting bar 24 helps limit and define the range of lateral movement as the cutting head passes vine/tree trunks, support structures (e.g., trellis stakes and supports), collectively TS, and row end posts EP.

Circumferentially disposed around the rotary disc 16 are a plurality of cultivator or cutting wheels 26, which are freely spinning ground-engaging cutting wheels ("star wheels") mounted on axles (not shown) on spring-biased mounting brackets 28. In turn, the mounting brackets are pivotally mounted on the rotary disc and urge the star wheels downwardly, when deployed into ground G. The star wheels penetrate at a depth D limited by a freely spinning spacer plate 30, affixed to the underside 32 of the rotary disc 16 which rotates freely with the rotary disc and slides across ground to keeps the star cutters from digging into ground at depths that could damage lateral roots and/or effectively bury the cutting head and thereby inhibit forward progress. The star cutters are set at an angle between 30 and 60 degrees in relation to the horizontal plane, and preferably about 45 degrees. Each star cutter includes a plurality of tines or cutting teeth 34 which may include serrations 36 on a forward edge 38.

FIGS. 2-3D and FIGS. 4A-5C together show generally how the cutting head moves laterally in and out from an in-row position as the tractor passes vine rootstock, tree trunks, trellis posts, end posts, and the like. Looking first at FIG. 2, when the cutting head is turned on, the left side rotary disc 16a spins rapidly in a counterclockwise direction and the right side rotary disc 16b spins in a clockwise direction (seen in more detail in FIGS. 4A-4C). The swing arm can be tilted down and rotated about its longitudinal axis to move the rotary disc into a toed-in or toed-out orientation and tilted back, in incremental amounts so as to provide means to finely tune the induced outward force from the star wheels cutting into ground, as is shown more fully in FIGS. 7A-7D.

Figure 2:
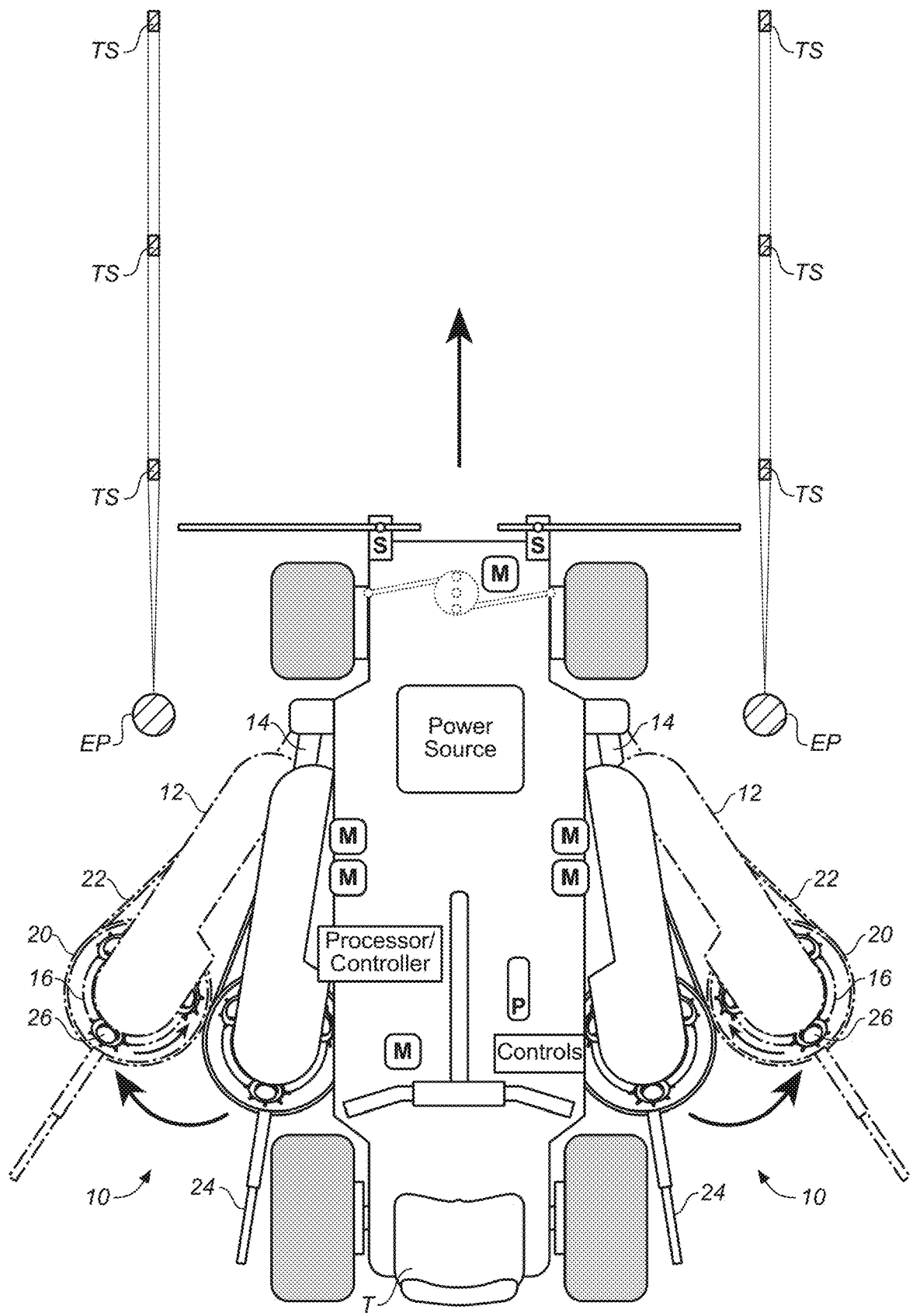
FIG. 2 is a highly schematic top plan view thereof.

FIG. 2 shows the swing arm deployed laterally using an actuator (not shown but well known in the art). When moving forward on generally level ground, the rotary disc is put into a generally level orientation (not angled or tilted) or tilted only slightly rearward, i.e., with the rotary disc trailing edge 40 tilted slightly downwardly, the star wheels 26 engage the ground more forcefully to drive the swing arm 12 in a direction generally opposite the lowest point on the tilted rotary disc—that is, approximately 180 degrees from the lowest point. The generally level angle of the rotary disc in FIG. 2 (spacer plate 30 level with ground) allows the rotary disc to move laterally into and out from the row of vines or trees and their support structures. Once the swing arm is deployed with the actuator, the remainder of the outward lateral movement of the cutting head 10 comes from rotary disc rotation alone. In this operation, the disc angle is not set and the other elements are not adjusted to resist movement of the cutting head laterally inward as it contacts important vertical structures, such as trunks, roots, posts, and the like.

Figure 3A:
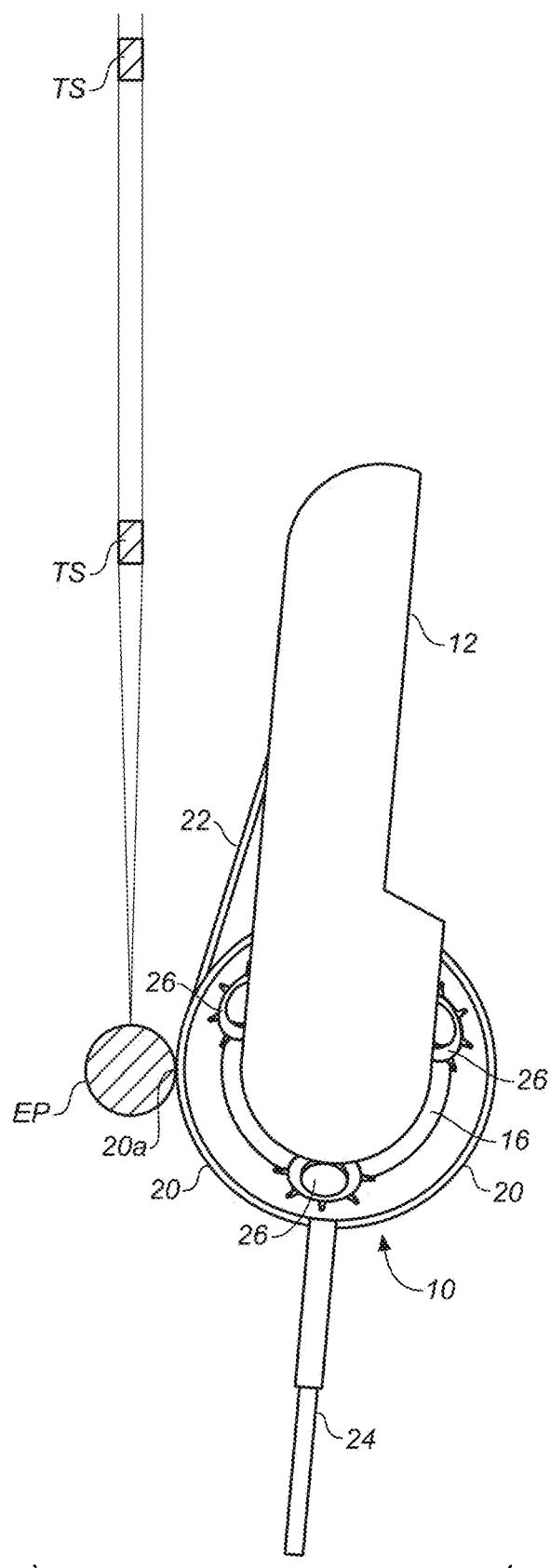
FIG. 3A is a schematic top plan view of the left side cutting head and pivoting arm, shown in relation to a vineyard end post and trellis stakes as the guard skirt of the cutting head makes contact with the end post.
Figure 3B:
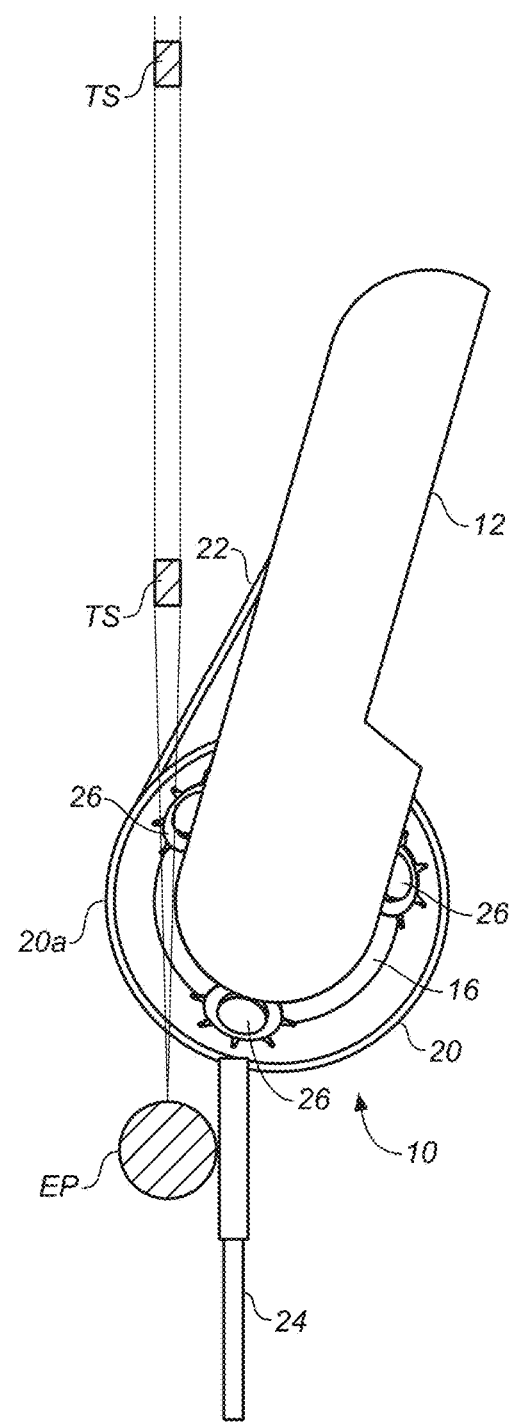
FIG. 3B is the same view showing the cutting head after it has moved past the end post.
Figure 3C:
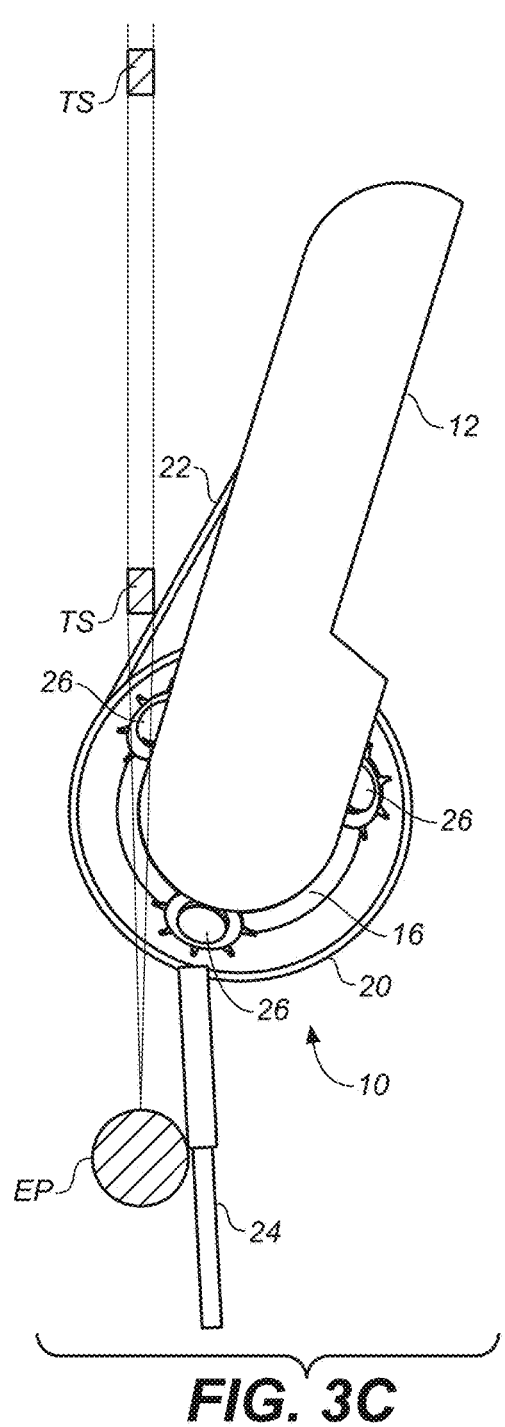
FIG. 3C is the same view showing the cutting head as it approaches a trellis stake.
Figure 3D:
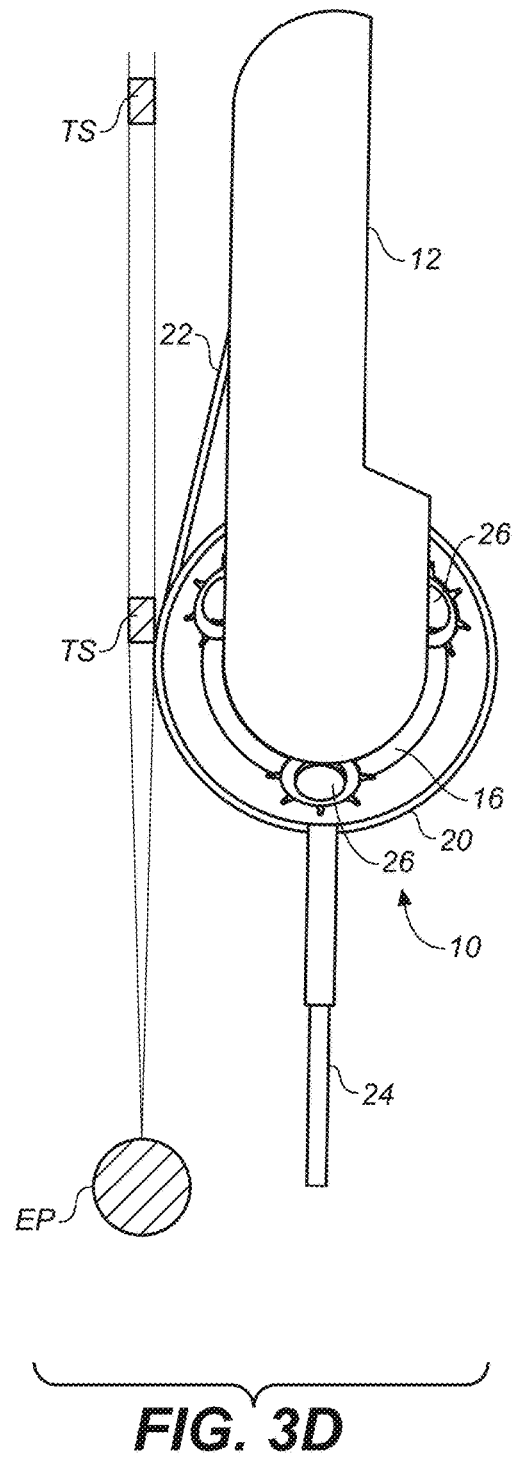
FIG. 3D shows the guard skirt of the cutting head contacting the trellis stake.
Figure 4A:
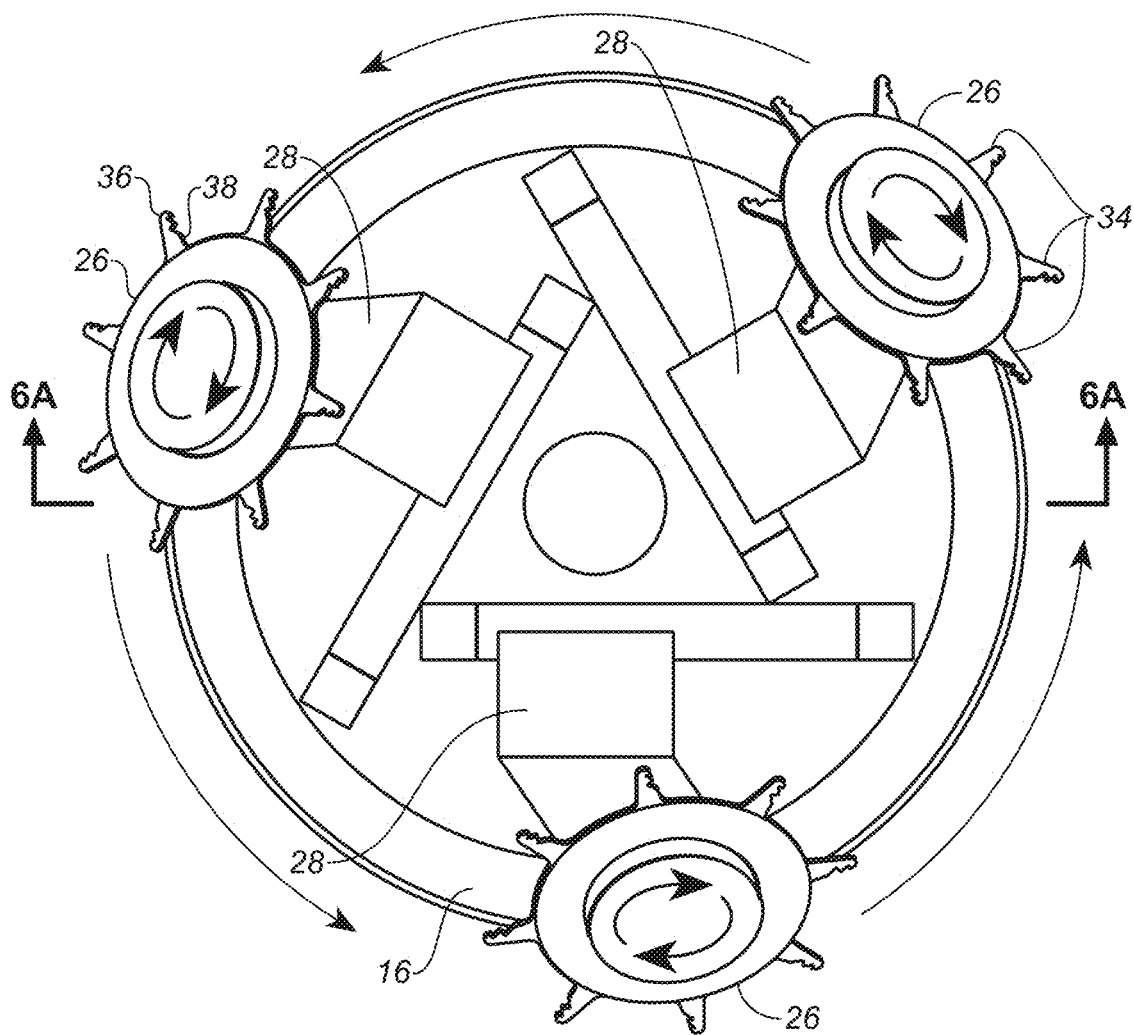
FIG. 4A is a top plan view of the rotary cutting head and circumferential tilling wheels as taken along section line 4A-4A of FIG. 5A, this view using the left side cutting head as the illustrative example.
Figure 5A:
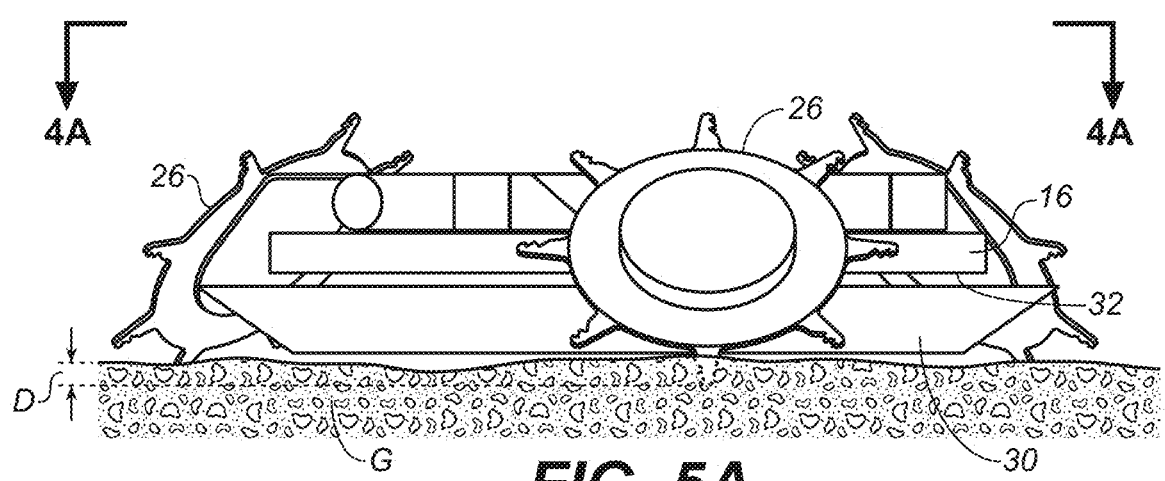
FIG. 5A is a side view in elevation of the cutting head as shown in FIG. 4A.
Figure 4B:
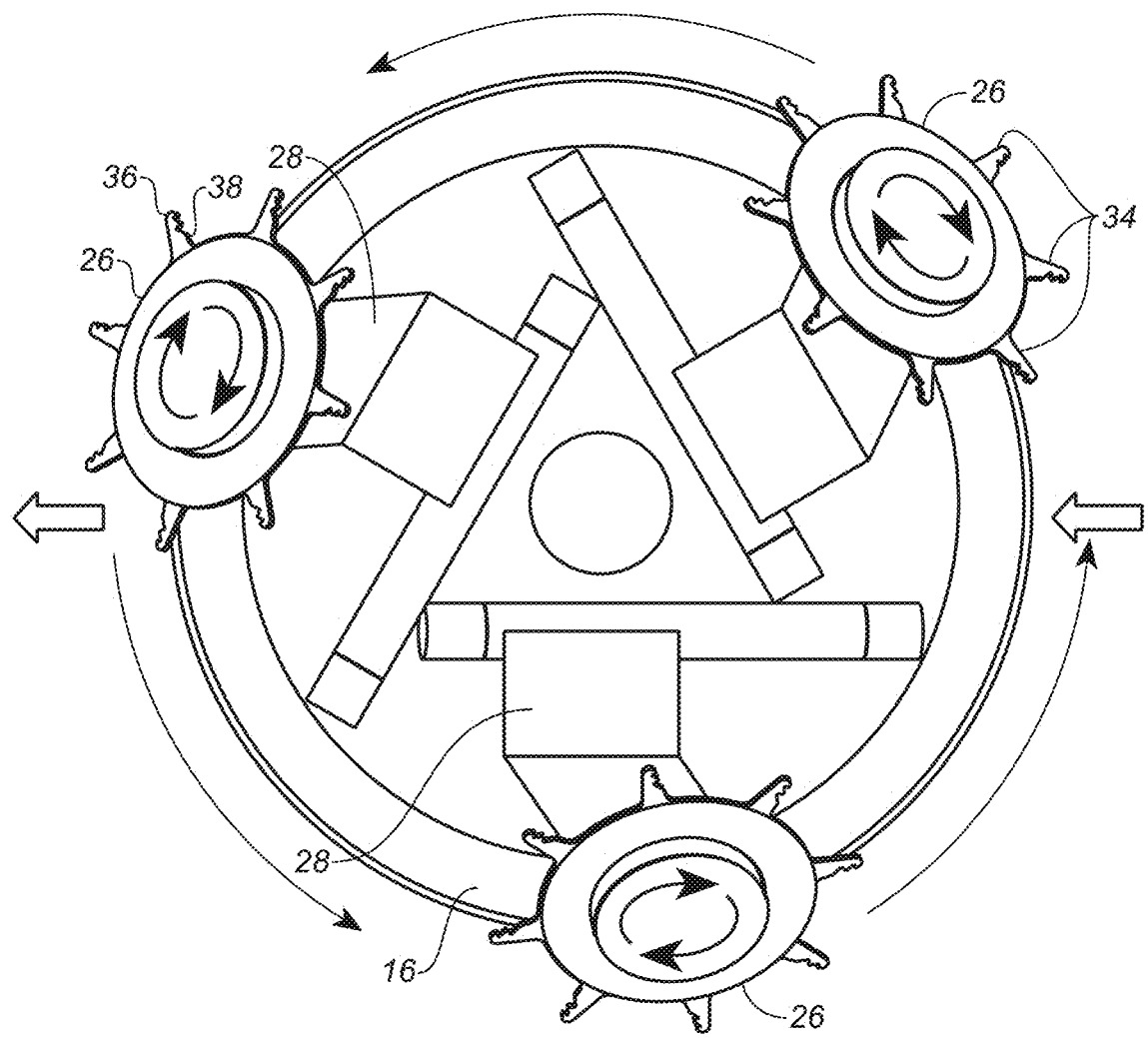
FIG. 4B is the same view illustrating the direction of rotation of the tilling wheels in relation to the rotary cutting head as taken along section line 4B-4B of FIG. 5B.
Figure 5B:
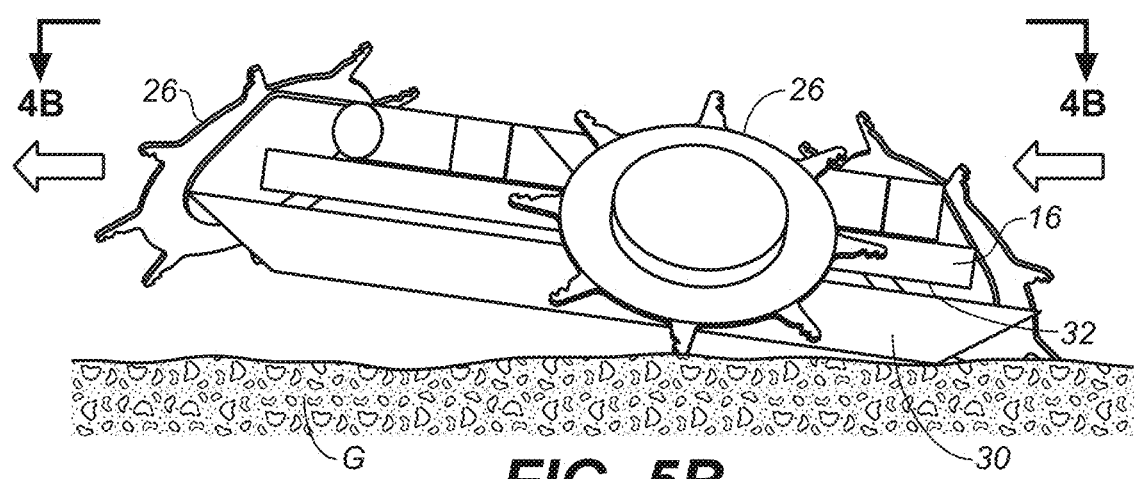
FIG. 5B is a side view in elevation of the left side cutting head tilted/angled outwardly relative to the tractor, as shown in FIG. 4B.
Figure 4C:
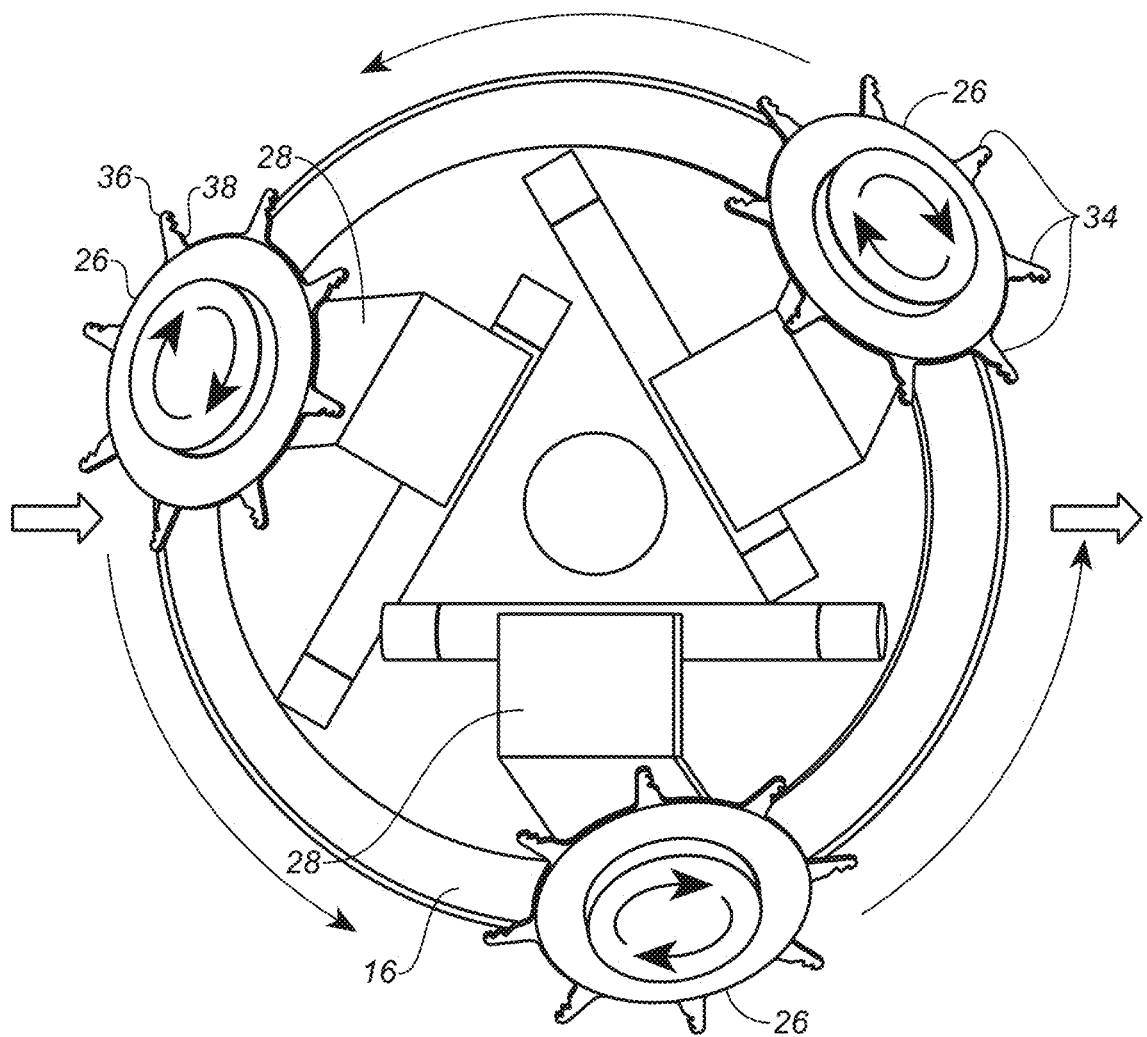
FIG. 4C is the same view illustrating the direction of rotation of the tilling wheels in relation to the rotary cutting head as taken along section line 4B-4B of FIG. 5B.
Figure 5C:
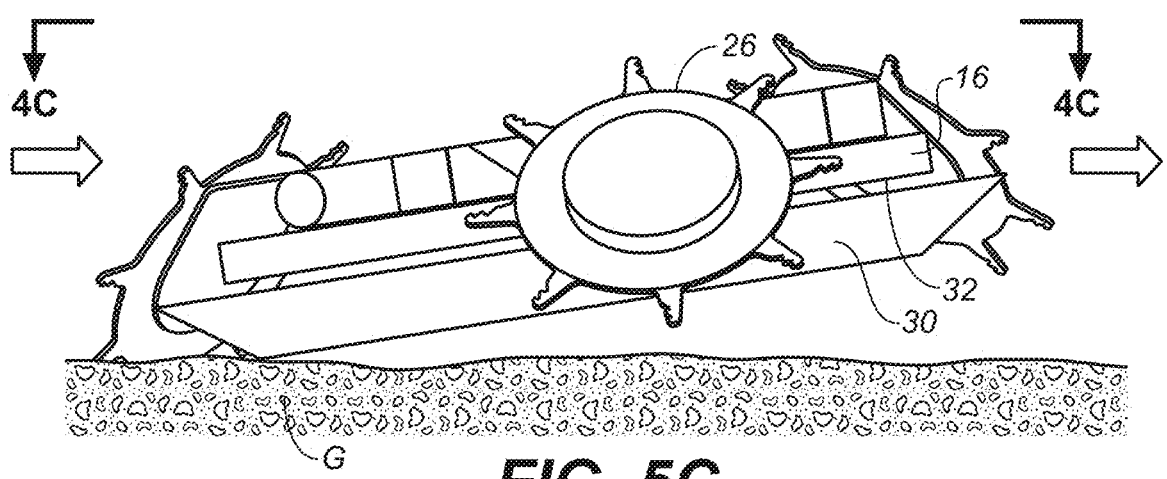
FIG. 5C is a side view in elevation of the left cutting head tilted/angled inwardly relative to the tractor, as shown in FIG. 5C.

Thus, as seen in FIG. 3A, as the cutting head rail extension 22 contacts an end post EP, the post pushes the cutting head 10 laterally (inward relative to the tractor). The post engages the rail extension and drives it inward and laterally, and the inward movement continues until the apex or outermost point 20a of the guard rail 20 contacts and passes by the innermost point on the post (FIG. 3B) at which point it thereafter quickly migrates back outwardly laterally so as to move back into the in-row tilling area, i.e, the area between the vines/trunks and support structures. The lateral movement out is rapid due to the rapid rotation of the rotary disc, such that the guard rail remains in contact with the post until it has moved entirely past the post. In consequence, there is the least amount of space between the post and the edge of the tilled soil. Indeed, in most instances, the star wheels remove soil and undesired plant material (read: weeds) slightly beyond the edge of the guard rail without coming into contact with a post or main trunk. Continuing forward, the cutting head removes in-row weeds until again contacting a trunk or structure (FIG. 3C), where it is again driven laterally inward (FIG. 3D). The cycle is easily and rapidly repeated as the cutting head moves down the row of plants, providing in-row weed removal as "close as possible" using purely mechanical means.

Referring next to FIGS. 4A through 5C, shown are various rotary disc angles relative to ground employed to control lateral movement of the cutting head. As noted, lateral movement of the cutting head is induced by angling the rotary disc 16 relative to ground. Thus, looking at the paired FIGS. 4B and 5B, it is seen that a toe-in tilt or angle of the rotary disc drives the inner side toward ground and the outer side away from ground, thus making the star wheels on the inner side dig deeper into ground as they spin by and effectively removes them from ground as they rotate up and around the outer side. Such an angle thereby induces outward lateral motion of the cutting head, as shown by the directional arrows. The opposite angle and induced motion is shown in the paired views of FIGS. 4C and 5C.

Figure 6A:
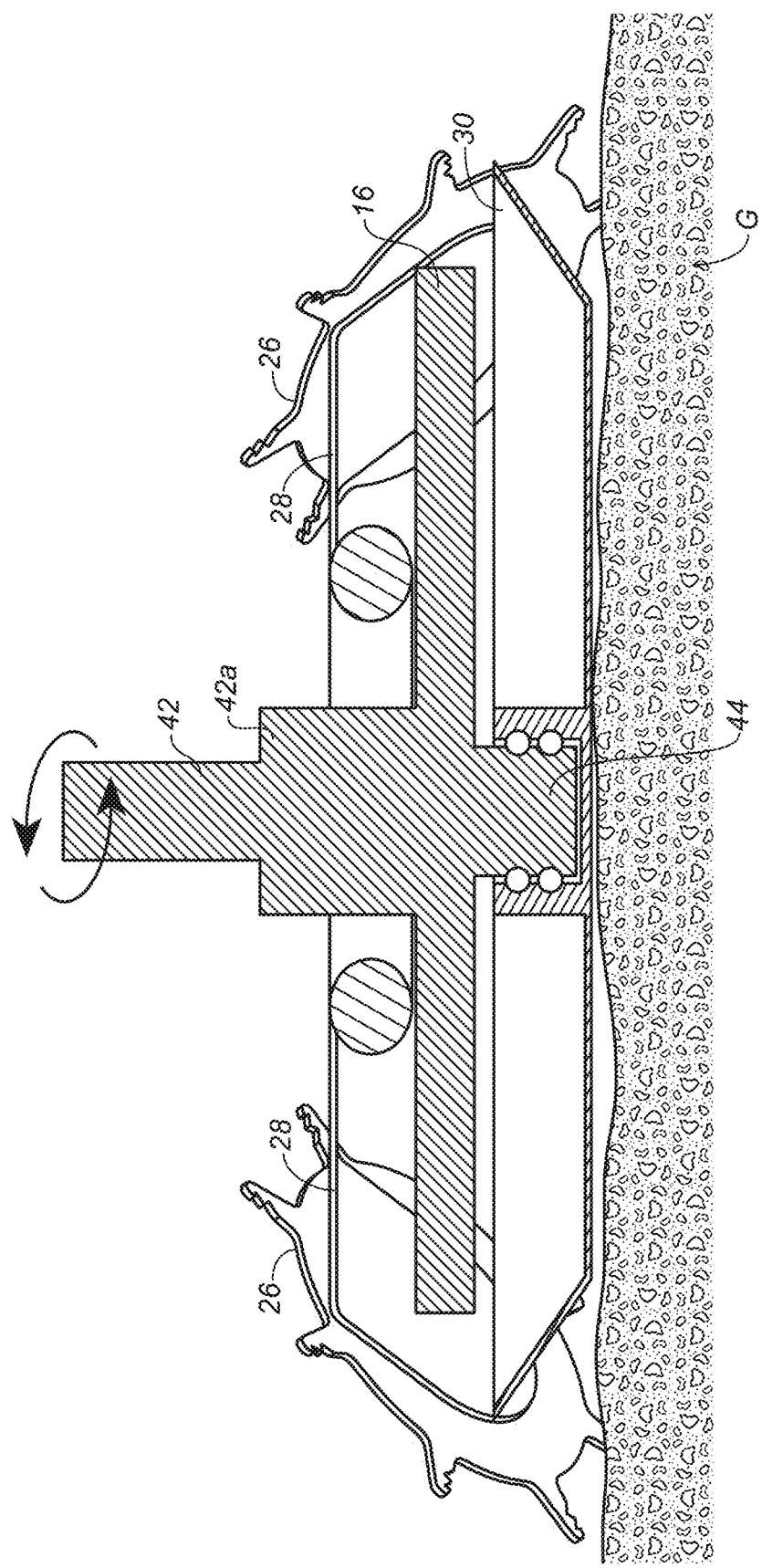
FIG. 6A is a cross-sectional side view in elevation of the cutting head taken along section line 6A-6A of FIG. 4A.

FIGS. 6A-6B feature details of the structural elements included in the rotary disc of the cutting head. Shown here are the following features: the rotary disc 16, the upper drive shaft 42, preferably having an expanded diameter 42a, either welded to or integral with the rotary disc, and the lower drive shaft 44 around which the spacer plate 30 rotates. The spacer includes a dual-channel bearing race 46 into and around which ball bearings 48 provide a low friction coupling to the lower drive shaft 44.

The fine tuning made possible with the adjustable cutting head is further shown in FIGS. 7A through 8C, and further in FIGS. 12A-15.

Figure 7A:
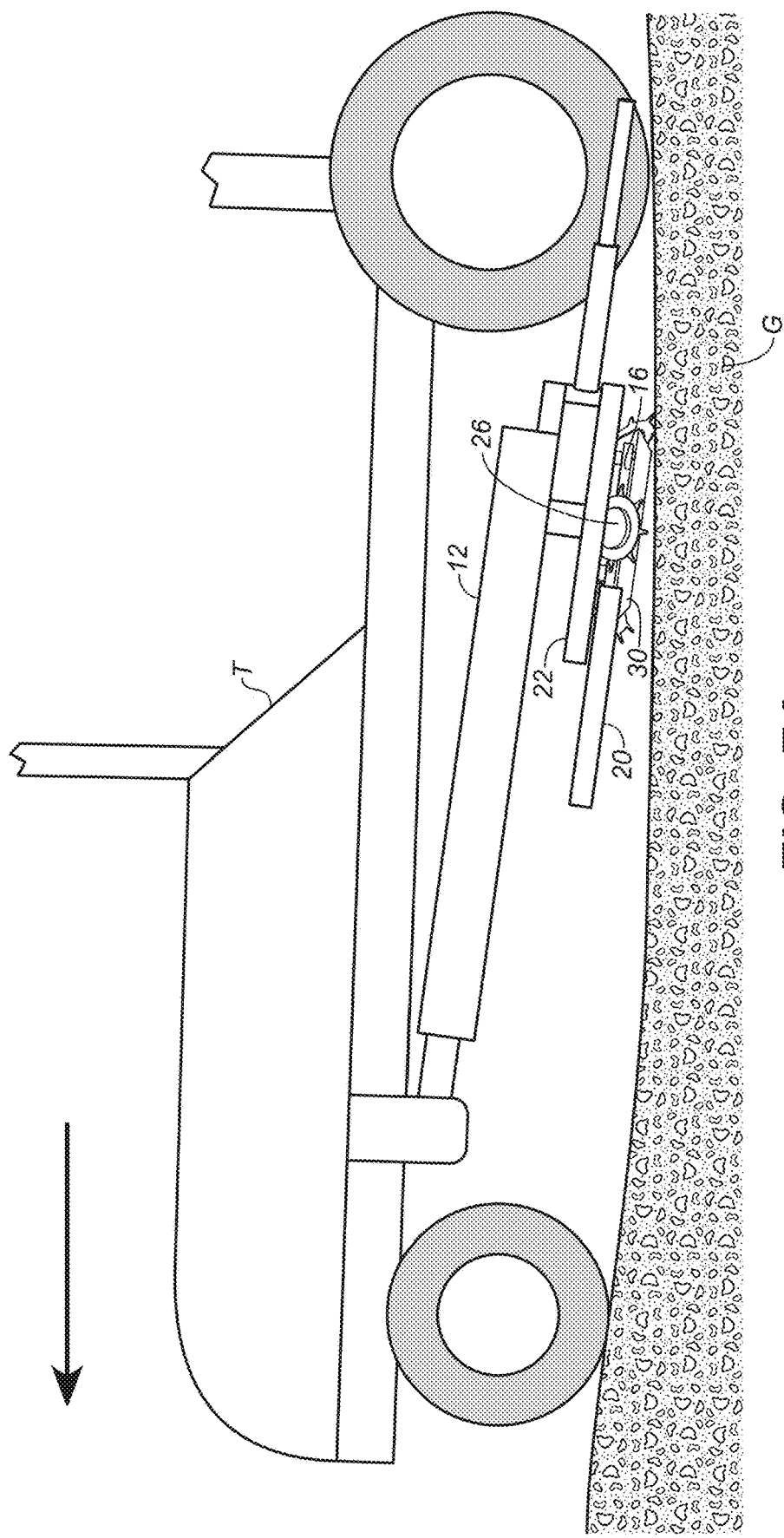
FIG. 7A is a schematic side view in elevation showing the cutting head tilted slightly rearward (trailing edge down) to create an angle of attack that offsets and compensates for the effect of gravity in urging the cutting head toward the tractor.

Looking first at FIG. 7A, there is shown the principal operating angle or tilt of the cutting head for the left side assembly—namely, with the leading edge of the rotary disc 16 very slightly angled up. This slight angle positively but gently moves the swing arm laterally out and away from the tractor.

Figure 8A:
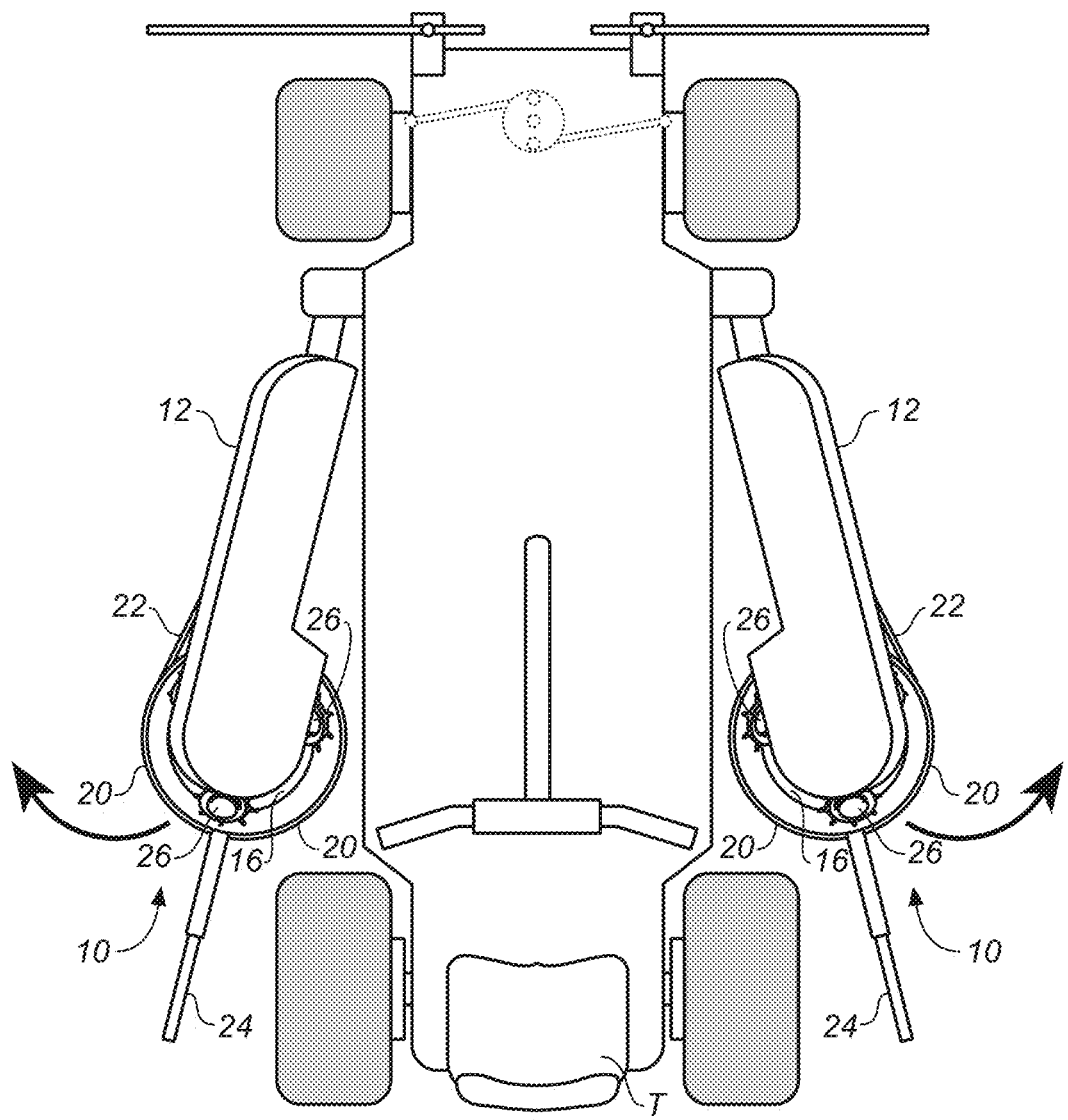
FIG. 8A is a top plan view taken along section line 8A-8A of FIG. 7B, this view including the cutting heads installed on a pivotally adjustable arm and illustrating the direction of travel induced by the cutting head tilt for uphill operation.

FIG. 7B and corresponding FIG. 8A show a tilt angle that can be introduced to offset the effect of gravity in driving the cutting head back toward the tractor when operating on a gentle uphill grade. As will be appreciated, because the rotary disc is rotating counterclockwise on the left side of the tractor, the leading edge upward tilt (trailing edge downward tilt) and outer edge may each be increased to increase the force with which the star wheels bite into ground, and the reactive ground force thus increases, thereby so does the force urging the entire cutting head outward, i.e., out and away from the side of the tractor. In this manner, the operator can finely tune the tilt of the rotary disc to offset and effectively balance the force with which the rotary disc is driven outward by rotation with the forces of gravity and the ground force induced by forward movement along the ground. Skillful operation of the tilt controls and simple observation of the immediate impact of inputs enables an operator to keep the rotary disc deployed precisely the desired distance laterally away from the tractor.

Figure 7C:
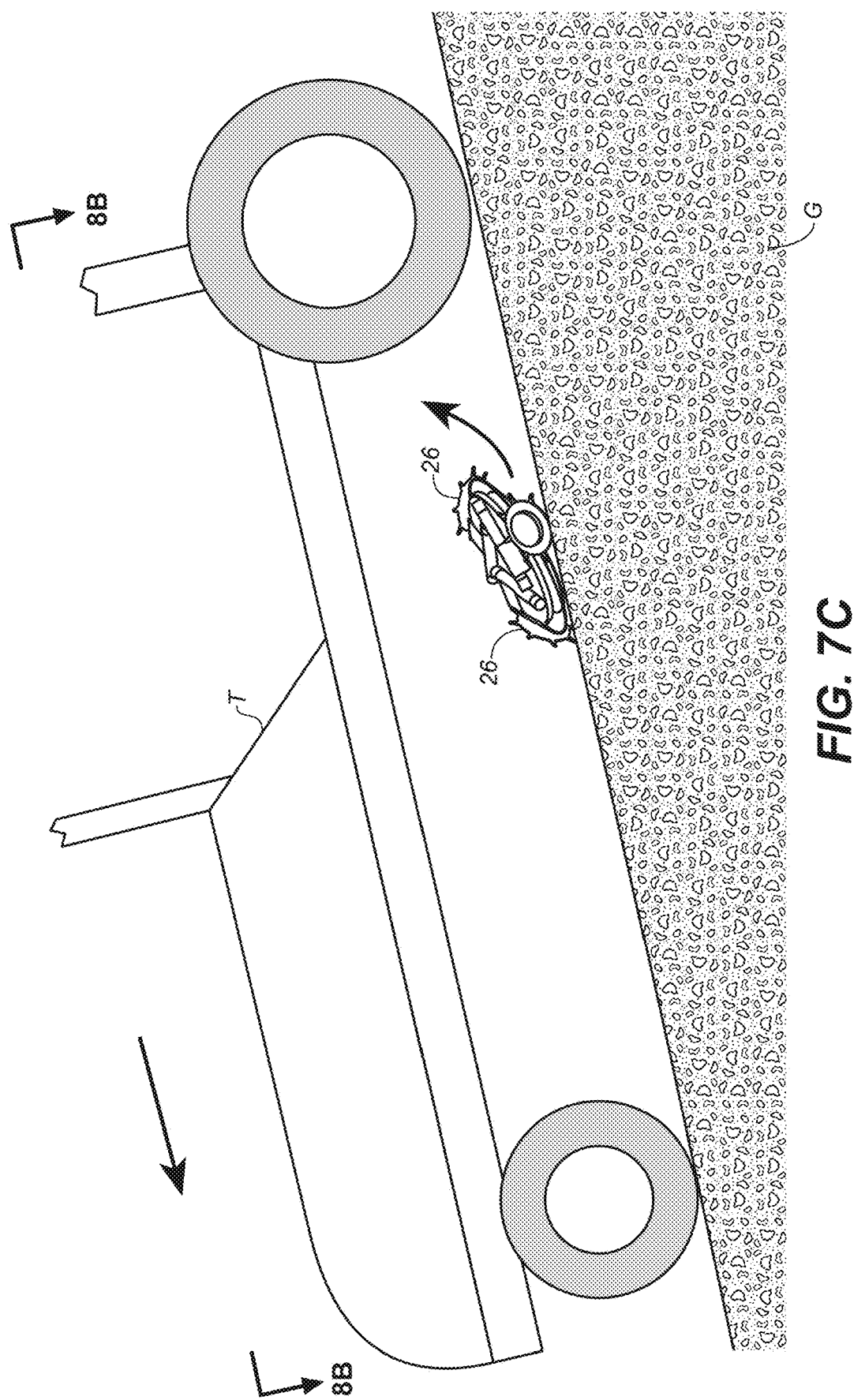
FIG. 7C shows the cutting head tilted slightly forward (leading edge down) to create an angle of attack that offsets and compensates for the effect of gravity in urging the cutting head away from the tractor.
Figure 8B:
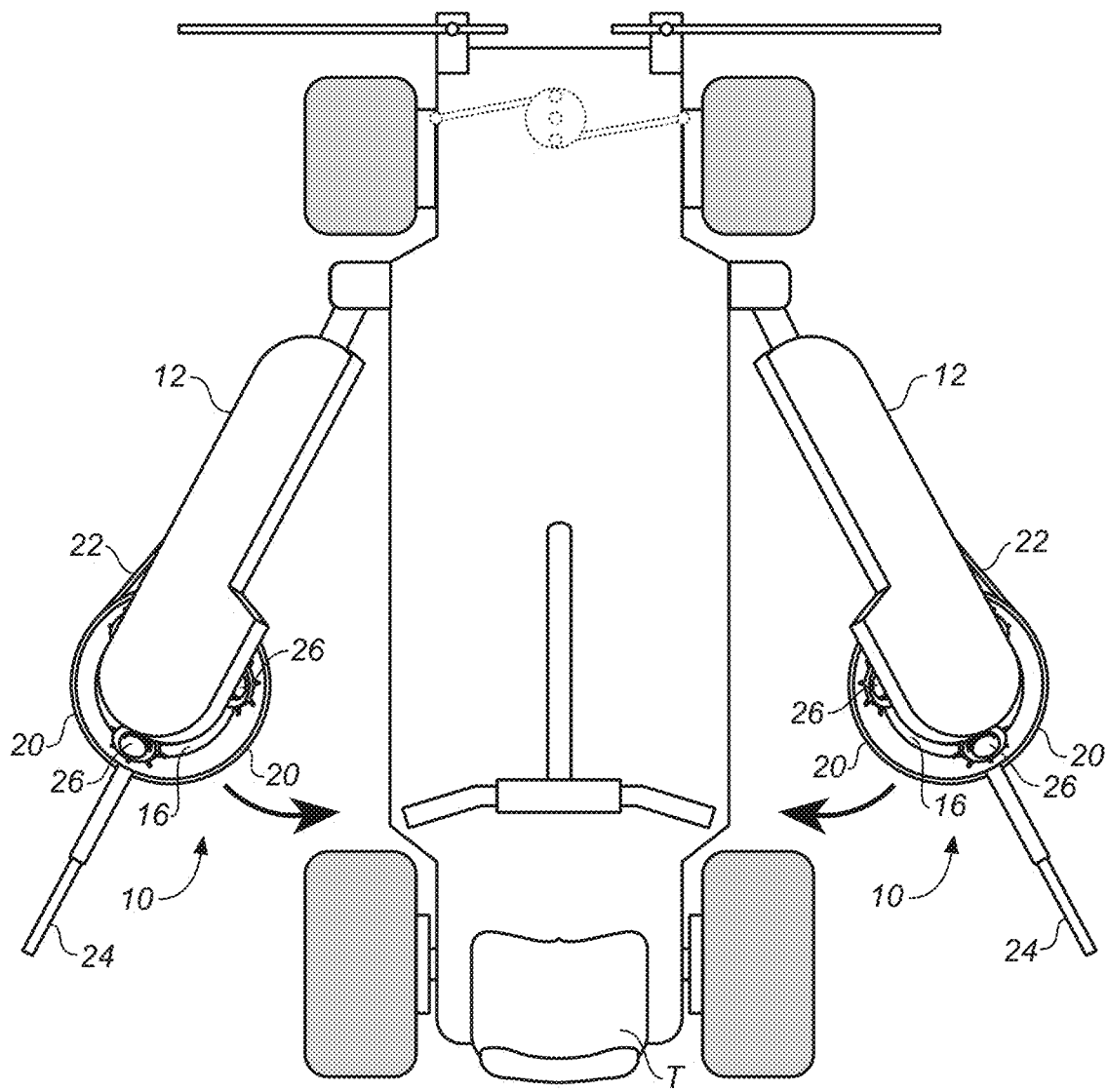
FIG. 8B is a top plan view taken along section line 8B-8B of FIG. 7C, illustrating the direction of travel induced by the cutting head tilt for downhill operation.
Figure 8C:
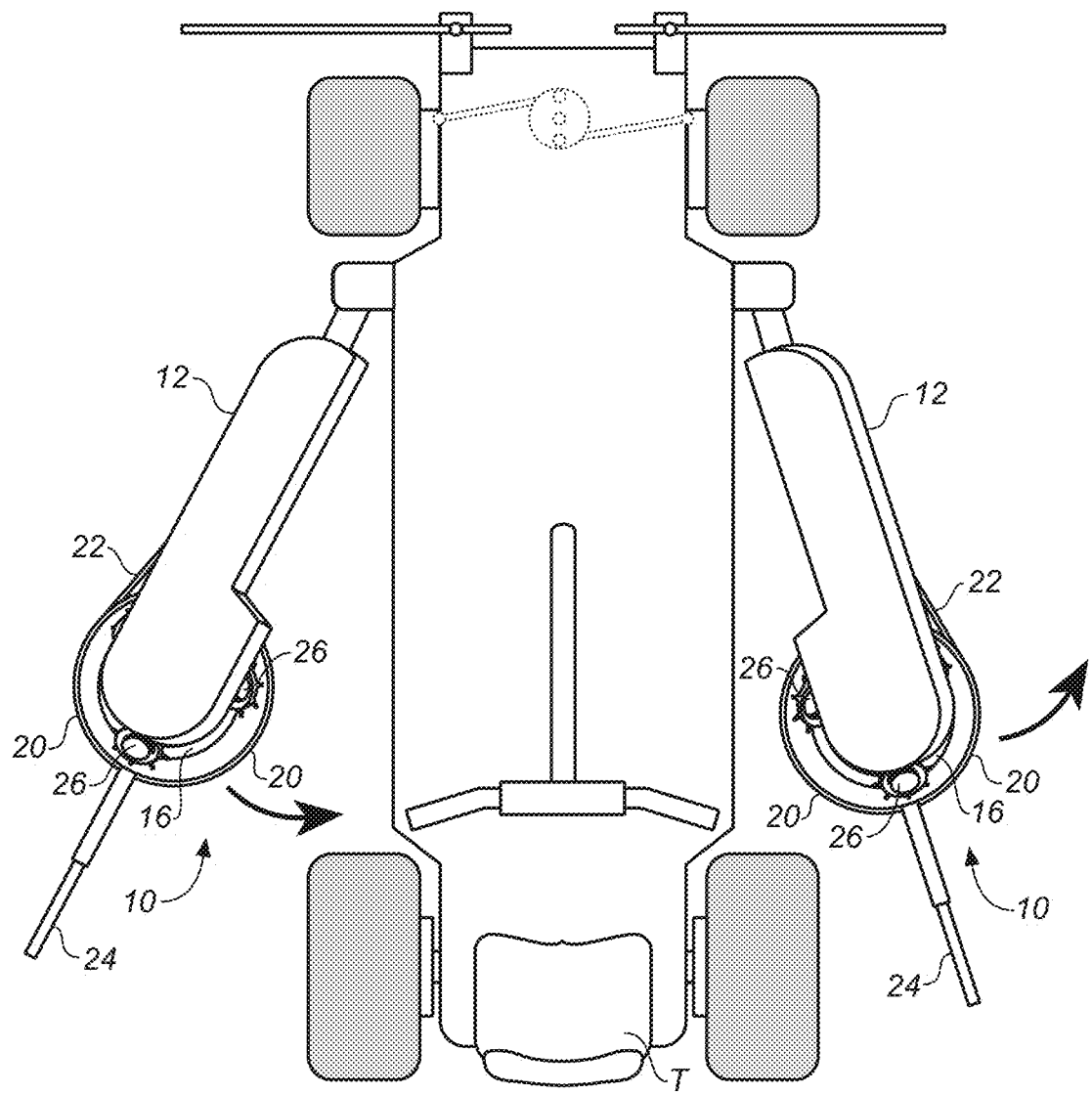
FIG. 8C is a top plan view taken along section line 8C-8C of FIG. 7D, this view illustrating the direction of travel induced by the cutting head tilt for side hill operation.

FIG. 7C and corresponding FIG. 8B shows the opposite tilt and configuration, used when the tractor is operating on a downhill grade.

Figure 7D:
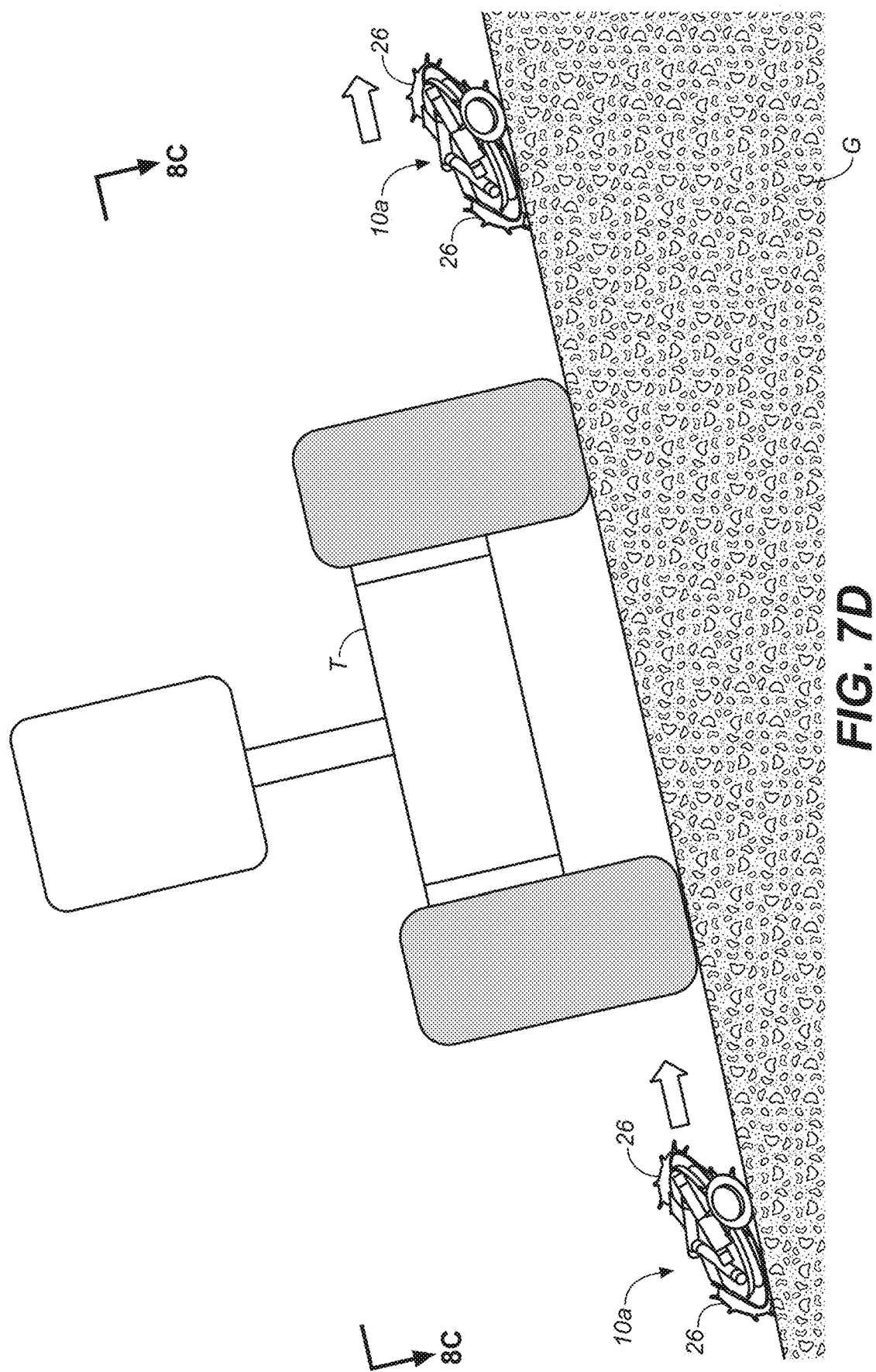
FIG. 7D is a rear end view of the tractor and cutting heads showing the angle of attack of the cutting heads in offsetting side slope forces.

FIG. 7D, by contrast, shows how the left cutting head 10a and the right cutting head 10b can be toed-out and toed-in, respectively, to offset gravity acting on the cutting heads and swing arm on a right side upslope.

Figure 9:
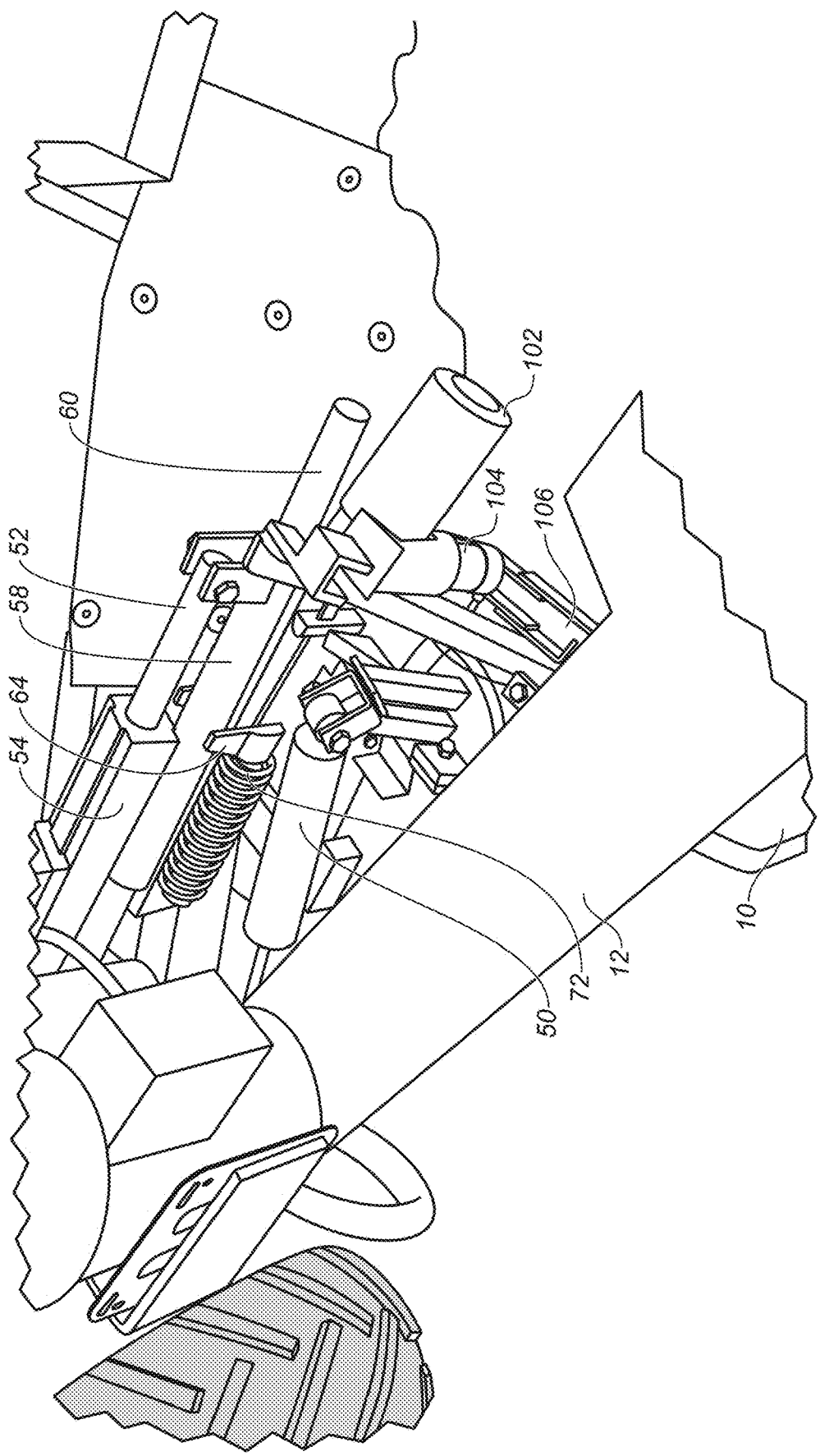
FIG. 9 is a perspective view showing an adjustable compression spring employed to fine tune and adjust the resistance of inward/outward movement of the cutting head pivot arm.
Figure 11A:
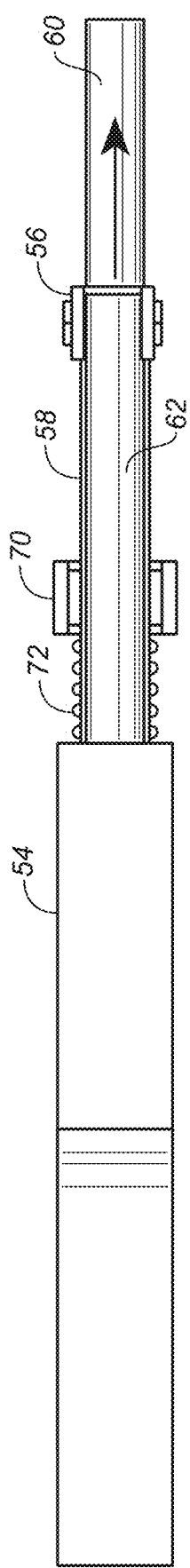
FIG. 11A is a top view corresponding to the compression spring shown in FIG. 10A.
Figure 11B:
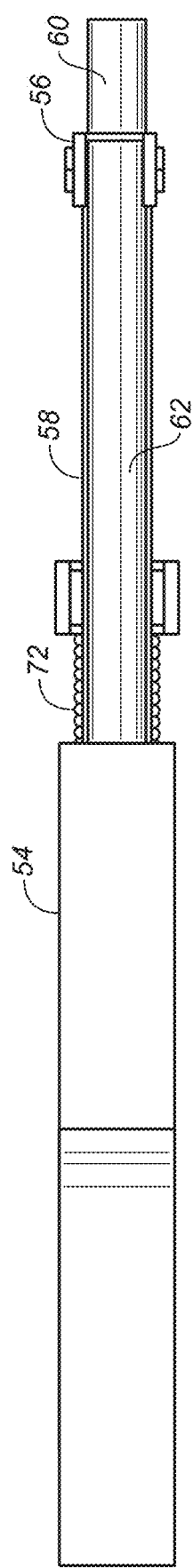
FIG. 11B is a top view corresponding to the compression spring shown in FIG. 10B.

FIG. 9 shows the linear actuator 50 that selectively lowers the swing arm 12 and cutting head 10 down to ground and also raises it for transport when not in operation. A spring assembly 52 with which to adjust compression in a compression spring to vary the degree to which the swing arm will resist being moved laterally when encountering impediments in the tilling path. FIG. 9 also shows the mechanism 100 for achieving tilt about a longitudinal axis of the swing arm. The mechanism includes a motor 102 operatively coupled to a drive shaft 104, which is in turn coupled to a lever 106 which tilts swing arm 12 about its longitudinal axis (see FIGS. 13A-13B), thereby adjusting the sideways tilt of the cutting head to toe it either inward or outward relative to the side of the tractor.

As shown in more detail in FIGS. 10A-11B, the compression spring assembly includes a linear actuator 54 (hydraulic or pneumatic) coupled to a bracket 56 welded to a sleeve 58 slidably disposed on a shaft 60 spaced apart from and parallel to the actuator rod 62. A U-shaped bracket 64 is welded at its upper arm 65 to the underside 66 of the sleeve and the lower arm 68 is inserted through a hole or slot in a fixed stop 70. A compression spring 72 is disposed on the lower arm 68 between the fixed stop and the stem 72 of the U-shaped bracket, such that extension of the actuator rod 62 compresses the spring against the fixed stop 70; retraction releases the compression. The lower end 74 of the vertical support 76 of the fixed stop 70 is rigidly connected to the inboard side of the swing arm, and the forward end 78 of the spring assembly is pivotally connected to the tractor. Thus, when in the compressed state, the spring assembly provides increased resistance to inward deflection of the cutting head when the guard rails encounter impediments in the tilling path. When in the uncompressed condition, the spring assembly may offer low to no resistance to such deflection.

Figure 12A:
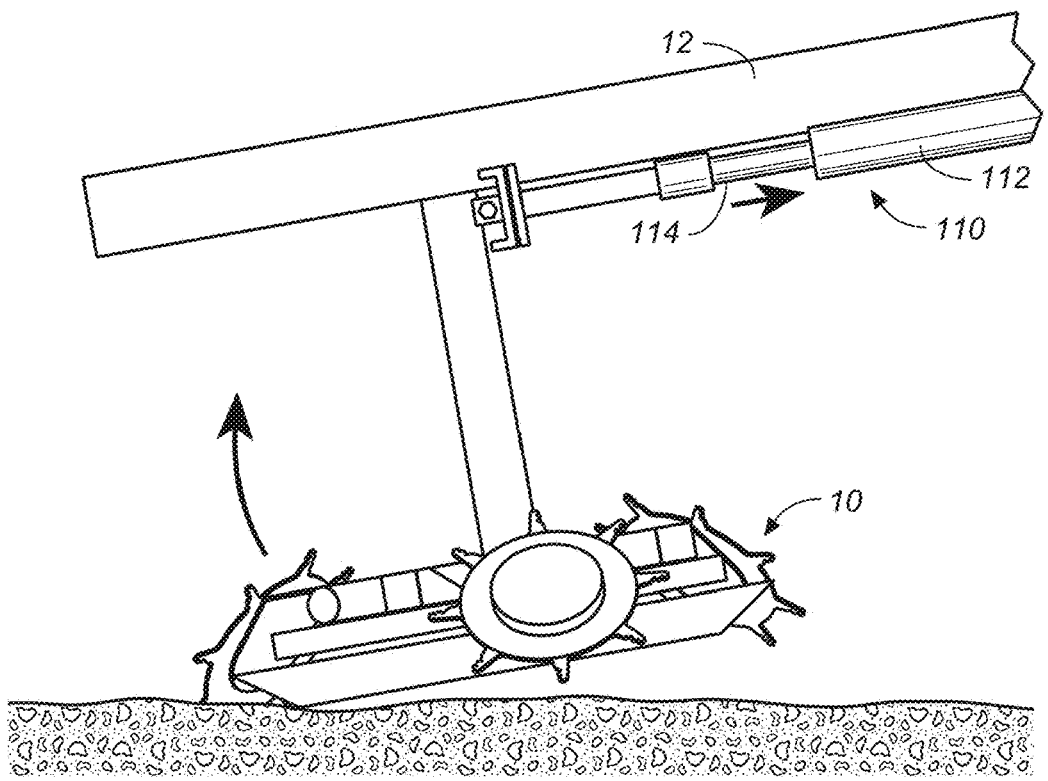
FIG. 12A is a right side view in elevation showing the adjustment mechanism for selectively bringing the cutting head into engagement and disengagement with the ground, FIG. 12A showing the head engaged with ground.
Figure 12B:
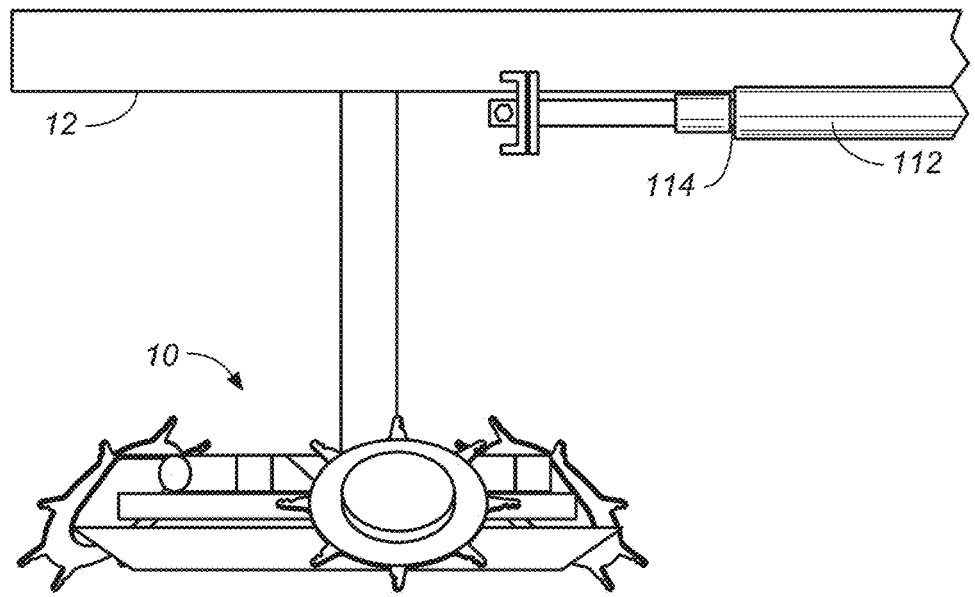
FIG. 12B is the same view showing the adjustment mechanism disengaging the cutting head from the ground.

FIGS. 12A-12B schematically show the adjustment mechanism 110 for lowering and raising the cutting head. In embodiments, the drive means is an actuator 112, which can be pneumatic, electric, or hydraulic, and in embodiments can be a screw drive or other reciprocating mechanism. The actuator is coupled across either a low or high pivot point and operatively coupled to the swing arm 12 and cutting head assembly 10, such that operator input to extend or retract the drive piston selectively brings the cutting head into engagement and disengagement with the ground.

Figure 13B:
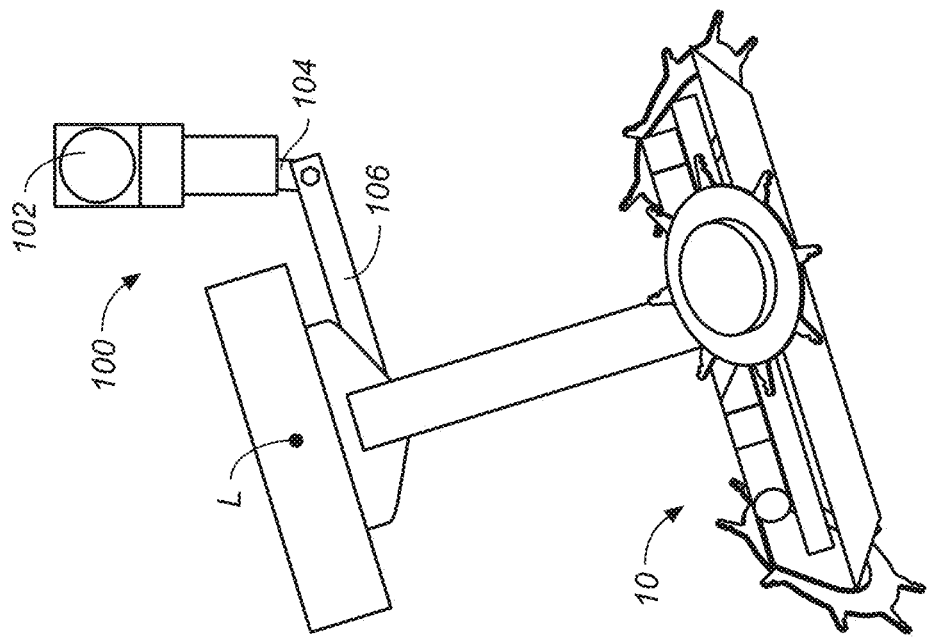
FIG. 13B is the same view showing the tilt mechanism placing the cutting head in a toed-out orientation, as might be used when operating on a side hill.
Figure 13A:
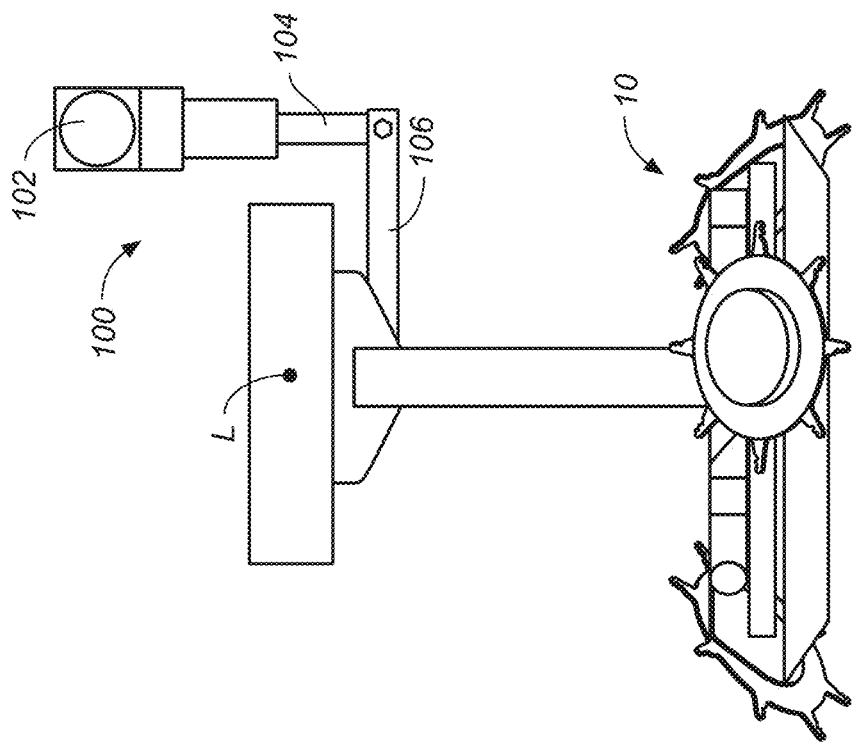
FIG. 13A is a left side end view showing the sideways tilt mechanism for rotating the swing arm about its longitudinal axis, thereby selectively placing the cutting head into either a toed in or toed out orientation relative to a tractor, FIG. 13A featuring the cutting head essentially level with ground.

FIGS. 13A-13B schematically show the toeing adjustment mechanism 100 for adjusting sideways tilt of the cutting head in relation to the tractor. Motor 102 drives push arm 104, which is pivotally coupled to lever 106, which is in turn operatively connected to swing arm 12 so as to enable rotation about the swing arm axis L. The toed-in and toed-out orientations enable an operator to set the cutting head on edge, and thereby to counteract forces from gravity and forward motion of the vehicle to keep the cutting head deployed a desired distance from the tractor.

FIGS. 14A-14B schematically show the mechanism 120 for deploying the swing arm 12 outwardly and away from the tractor T into an operating position. The swing arm is pivotally mounted to the tractor chassis at a pivot point 122. In embodiments, the mechanism is a simple actuator 124 having a drive piston 126 pivotally coupled to the swing arm. Extension and retraction of the arm selectively push the swing arm out and pull it in, respectively.

Figure 15A:
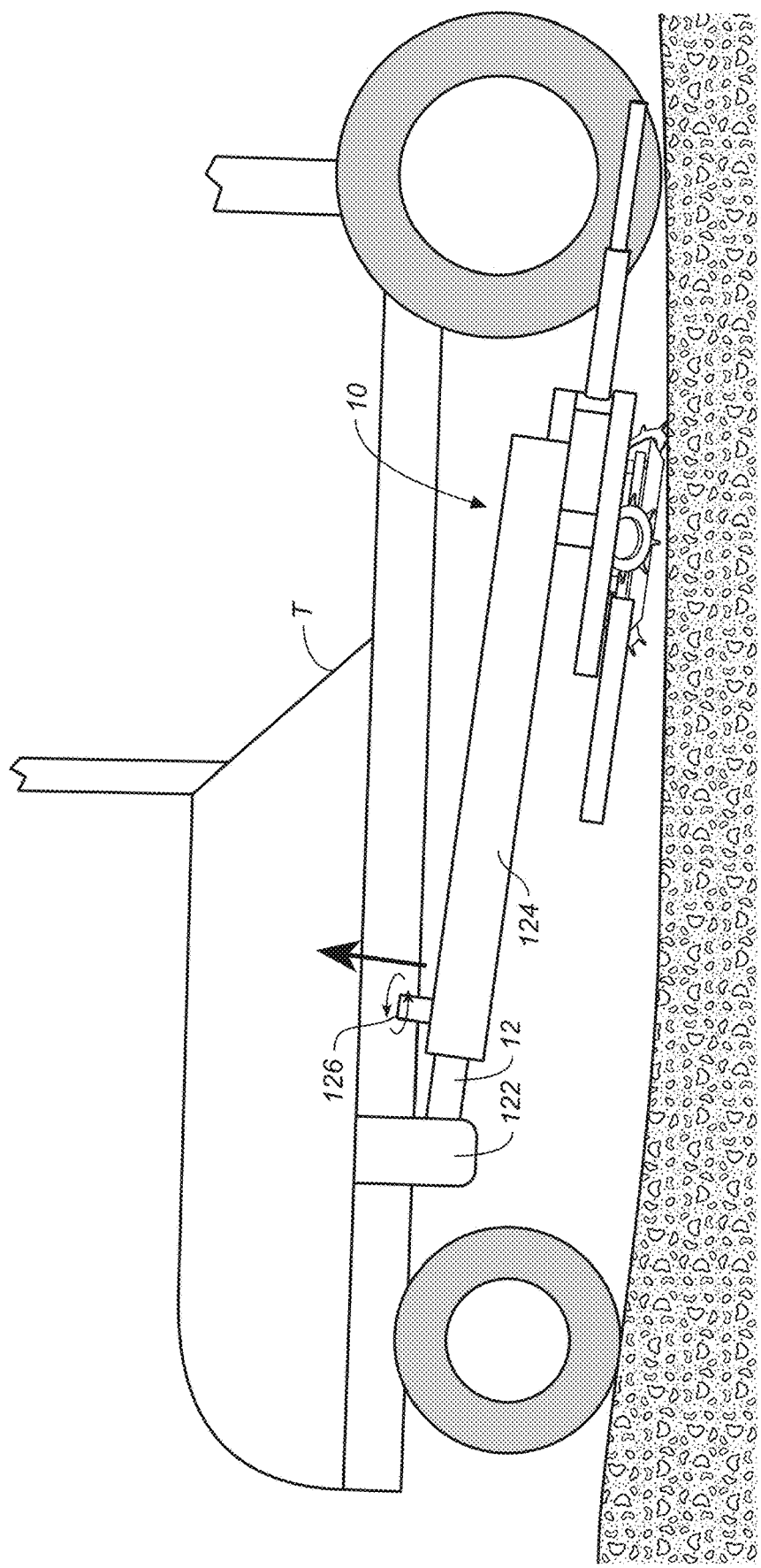
FIG. 15A is a left side view in elevation showing the mechanism for adjusting the cutting depth of the cutting head, this view featuring the cutting head adjusted for relatively shallow cutting depth.
Figure 15B:
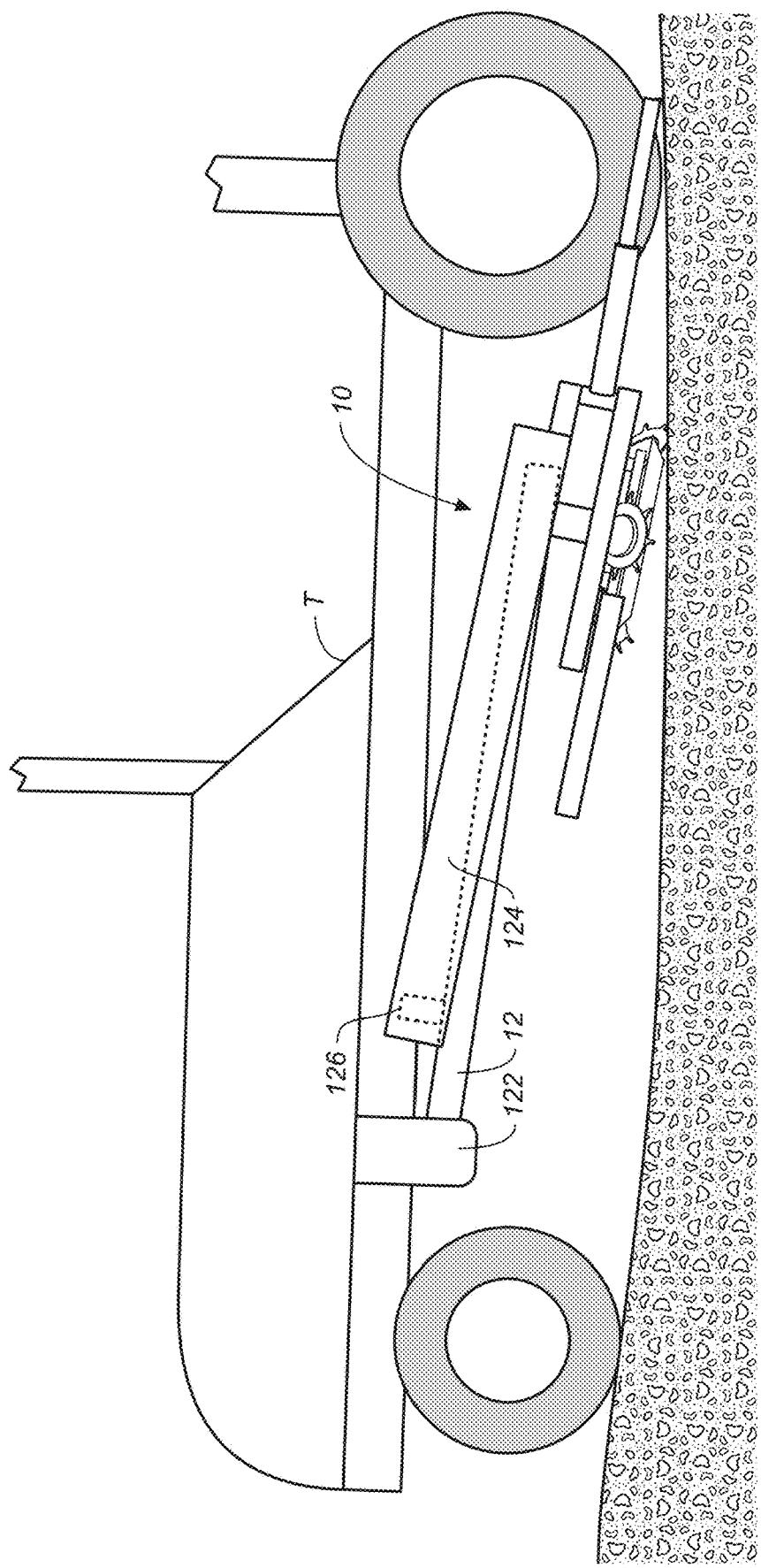
FIG. 15B is the same view showing the depth cutting mechanism employed to set the cutting head for deeper cultivation.

FIGS. 15A-15B show a mechanism for adjusting the cutting depth of the cutting head 10. Note should be made that numerous functional features and structures are removed in these views to enable viewing the cutting depth mechanism in isolation. The cutting head assembly and its belt drive are mounted on a unified platform 124, which is then adjustably mounted on the swing arm 12. The platform 124 is driven by a drive screw 126 on either the swing arm or the platform to pivot the platform in small amounts relative to the swing arm to alter the angle of the cutting head in relation to the swing arm, thereby altering the angle of the cutting head to the ground. This adjustment further enables the operator to fine tune the cutting head position in relation to the tractor motion caused by forward motion and gravity, as well as to adjust cutting depth itself.

The foregoing describes a novel and improved cutting head for a vineyard and orchard tiller and cultivator that achieves all of the objects and advantages set forth above. As will be readily obvious to one with skill in the art, construction details and embodiments of the invention may vary widely with respect to what is described and illustrated herein, all without departing from the scope of protection of the invention as described in the claims that follow.

What is claimed as invention is:

1. A tractor mounted tiller/cultivator system, comprising:
   right and left swing arms structured for pivotal and adjustable connection to a tractor chassis and having an inboard portion and an outboard portion;
   a right cutting head assembly mounted on said right swing arm, said right cutting head assembly including, a right disc motor mounted on said inboard portion of said right swing arm, a driven right rotary disc mounted on said outboard portion of said right swing arm and operatively coupled to said right disc motor, and a plurality of ground-engaging cultivation wheels rotatingly mounted on axles and circumferentially disposed around said right rotary disc, and an annular guard circumferentially disposed around said right rotary disc;
   a left cutting head assembly mounted on said left swing arm, said left cutting head assembly including, a left disc motor mounted on said inboard portion of said left swing arm, a driven left rotary disc mounted on said outboard portion of said left swing arm and operatively coupled to said left disc motor, and a plurality of ground-engaging cultivation wheels rotatingly mounted on axles and circumferentially disposed around said left rotary disc, and an annular guard circumferentially disposed around said left rotary disc;
   right and left drive mechanisms for lowering and elevating each of said left and right swing arms so as to selectively put said cultivation wheels into engagement and disengagement with ground and to rotate said swing arms about their respective longitudinal axis so as to selectively place said rotary discs in a toed-in or toed-out angle; and
   user controls operatively connected to said swing arms, said cutting head assemblies, and said drive mechanisms.

2. The system of claim 1, wherein in operation, the angle of each of said rotary discs urges its respective swing arm to pivot outwardly.

3. The system of claim 1, wherein said cultivation wheels are star wheels having a plurality of tines.

4. The system of claim 3, wherein said cultivation wheels are mounted on a spring-biased mounting bracket pivotally connected to said rotary disc so as to urge said cultivation wheels downward.

5. The system of claim 1, further including a freely spinning spacer plate rotatingly disposed on the underside of said rotary disc and having a flat underside, said spacer plate limiting the depth at which said cultivation wheels penetrate ground and facilitating smooth operation of said rotary discs over ground.

6. The system of claim 1, wherein said cultivation wheels are set at an angle between 30 and 60 degrees in relation to a horizontal plane.

7. The system of claim 1, wherein said left rotary disc is driven to spin in a counterclockwise direction, and said right rotary disc is driven to spin in a clockwise direction.

8. The system of claim 1, wherein said drive mechanisms are linear actuators.

9. The system of claim 1, further including right and left pivoting limiting bars horizontally disposed and extending behind each of said right and left rotary discs, respectively, said limiting bars pivoting to sweep a limited radius so as to prevent said rotary discs from moving too far laterally outward.

10. The system of claim 1, further including right and left adjustable spring assemblies operatively coupled to said first and second swing arms, respectively, to adjust the force that must be applied to each of said swing arms to deflect them laterally inward.

11. The system of claim 10, wherein said right and left adjustable spring assemblies each include a spring which selectively compresses increasingly to provide increasing resistance to inward lateral movement of said swing arm.

12. The system of claim 1, wherein said right and left rotary discs are belt driven.

13. The system of claim 1, further including a right and left angled rail extension projecting forward of said right and left annular cage, respectively.

14. A cultivator/tiller cutting head assembly, comprising:
    a swing arm with attachment structure for pivotal attachment at a pivot point to a fixed portion of a tractor chassis or frame, said swing arm having a proximal portion proximate to said pivot point and a distal portion distal to said pivot point;

a cutting head motor disposed on said swing arm on said proximal portion;

a cutting head operatively connected to said motor and having a driven rotary disc with a plurality of freely rotating spaced-apart cultivation wheels rotatably attached to and circumferentially disposed around the outer circumference of said rotary disc;

an annular rail surrounding said rotary disc and said cultivation wheels;

a drive mechanism to raise said swing arm to remove said cultivation wheels from engagement with ground and to lower said swing arm so as to bring said cultivation wheels into engagement with ground;

a spring-biasing mechanism engaging said swing arm for selectively resisting inward pivot motion of said swing arm;

rotary disc tilting mechanism to selectively alter the angle of said rotary disc in relation to ground; and controls operatively connected to said cutting head assembly with controls to lower and raise said swing arm, turn said cutting head motor on and off and vary its speed, to tilt said rotary disc, and to adjust the force required to deflect said rotary disc from its travel direction.

15. The cutting head assembly of claim 14, wherein said cutting head motor is an electric motor.

* * * * *